(12) United States Patent
Lee et al.

(10) Patent No.: US 8,213,155 B2
(45) Date of Patent: Jul. 3, 2012

(54) MULTILAYER CHIP CAPACITOR

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 554 days.

(21) Appl. No.: 12/340,200

(22) Filed: Dec. 19, 2008

(65) Prior Publication Data
US 2010/0033897 A1 Feb. 11, 2010

(30) Foreign Application Priority Data
Aug. 8, 2008 (KR) .................. 10-2008-0077971

(51) Int. Cl.
*H01G 4/005* (2006.01)
*H01G 4/228* (2006.01)
(52) U.S. Cl. ............... 361/329; 361/303; 361/306.1
(58) Field of Classification Search .............. 361/303, 361/311, 328, 329
See application file for complete search history.

(56) References Cited

U.S. PATENT DOCUMENTS
2007/0121275 A1* 5/2007 Takashima et al. ........... 361/311
2008/0204969 A1 8/2008 Takashima et al.

FOREIGN PATENT DOCUMENTS
| JP | 06-053075 | 2/1994 |
| JP | 08097070 A | * 4/1996 |
| JP | 2006-203258 | 8/2006 |
| JP | 2006-286731 | 10/2006 |
| KR | 10-2008-0064980 | 7/2008 |

OTHER PUBLICATIONS

Korean Office Action, with English translation, issued in Korean Patent Application No. 10-2008-0077971, dated Apr. 23, 2010.

* cited by examiner

*Primary Examiner* — Eric Thomas
(74) *Attorney, Agent, or Firm* — McDermott Will & Emery LLP

(57) ABSTRACT

There is provided a multilayer chip capacitor a multilayer chip capacitor including: a capacitor body including first and second capacitor units arranged therein; and first to fourth outer electrodes, wherein the first capacitor unit includes first and second inner electrodes, and the first capacitor unit includes a plurality of capacitor elements each having a pair of the first and second inner electrodes repeatedly laminated, the second capacitor unit includes third and fourth inner electrodes, and the second capacitor unit includes at least one capacitor element having a pair of the third and fourth inner electrodes repeatedly laminated, and at least one of the capacitor elements of the first capacitor unit is different from the other capacitor elements of the first capacitor unit in a lamination number of the first and second inner electrodes or a resonant frequency.

34 Claims, 26 Drawing Sheets

MULTILAYER CHIP CAPACITOR

CROSS-REFERENCE TO RELATED APPLICATIONS

This application claims the priority of Korean Patent Application No. 2008-0077971 filed on Aug. 8, 2008, in the Korean Intellectual Property Office, the disclosure of which is incorporated herein by reference.

BACKGROUND OF THE INVENTION

1. Field of the Invention

The present invention relates to a multilayer chip capacitor, and more particularly, to a multilayer chip capacitor suitably used as a decoupling capacitor of a power distribution network of a microprocessor unit (MPU) and capable of reducing a power distribution network impedance to a target impedance or less in a broad frequency range as a single capacitor.

2. Description of the Related Art

A power distribution network (PDN) of a micro processor unit (MPU) is designed with increasing difficulty due to higher speed and more integration of the MPU. Notably, a decrease in a power voltage and an increase in an MPU consumption current resulting from more integration of the MPU has been gradually lowering a target impedance $Z_{target}$, as represented by following Equation 1:

$$Z_{target} = Vp \times AR/I = Vr/I \quad \text{Equation 1,}$$

where Vp is a power voltage, AR is an allowed ripple, I is an MPU consumption current, an Vr is an allowed ripple voltage.

A general ripple voltage Vr is a value equal to 5-10% of the power voltage. The target impedance $Z_{target}$ should be satisfied not only in a direct current (DC) but also in all frequencies where a transient current is present. A personal computer (PC) or a laptop computer undergoes a transient current even in a very high frequency range due to higher speed of a central processing unit (CPU), i.e., MPU chip and thus should satisfy a target impedance even in a broad frequency range. To satisfy the target impedance in each frequency range, the PDN employs a voltage regulator module (VRM), a bulk capacitor, a general two-terminal MLCC and a low equivalent series inductance (ESL) MLCC. This PDN is referred to as a multi-stage PDN (see FIG. 23B).

The VRM, bulk capacitor and general two-terminal multilayer chip capacitor (MLCC) supply a current in a frequency range of several kHz, several kHz to hundreds of kHz, hundreds of kHz to several MHz, respectively and serve to lower impedance of the PDN. Unlike the bulk capacitor or general two-terminal MLCC directly installed on a motherboard, the low ESL MLCC is typically installed on a CPU package to supply a current in a frequency range of at least several MHz and reduce impedance. Finally, a die capacitor within the CPU supplies a current and lowers impedance of the PDN in a frequency higher than an effective frequency of the low ESL MLCC. The plurality of bulk capacitors, general two-terminal MLCC and low ESL MLCC are connected in parallel to one another.

FIG. 1 is a schematic graph illustrating magnitude of impedance Z with respect to frequency of a general multi-stage PDN. In each stage, the VRM, bulk capacitor, general two-terminal MLCC, low ESL MLCC and die capacitor have respective impedances $Z_{REG}$, $Z_{BLK}$, $Z_{MF}$, $Z_{PKG}$, and $Z_{DIE}$ determining the impedance of an entire PDN. Accordingly, as shown, impedance of an individual capacitor greatly affects an impedance profile of the entire PDN. Also, an impedance of a previous stage capacitor is associated with an impedance of a next stage capacitor to determine the impedance of the entire PDN. In designing the PDN, an impedance at the each stage cannot be determined independently but the impedance of the entire PDN should be considered. A general two terminal MLCC which has a relatively higher ESL is installed on a motherboard or CPU package for mid-frequency decoupling. Also, a low ESL MLCC is installed in the CPU package for high-frequency decoupling. In a case where the PDN is designed to satisfy impedance characteristics in a wider frequency range, a greater number of decoupling capacitors may be utilized to cover wide frequency ranges (see FIG. 23B).

FIG. 2 schematically illustrates a conventional motherboard apparatus having decoupling capacitors connected thereto by MPU power circuits. Referring to FIG. 2, a CPU, i.e., MPU chip 51 is surface-mounted on a package board 53 to form CPU packages 51 and 53. Theses CPU packages 51 and 53 are surface-mounted onto a motherboard 55. Circuit conductors such as power (PWR) planes, ground (GND) planes, vias are provided inside and on an outer surface of the motherboard 55 and the package board 53 to configure a power circuit. Also, bumps or pins 15 are utilized to electrically connect the components 53 and 55. Decoupling capacitors 10 and 20 of different types according to the frequency range are connected to this power circuit to form a multi-stage PDN. The low ESL MLCC 10 for high-frequency decoupling, for example, a low inductance ceramic capacitor (LICC) or an interdigital capacitor (IDC) may be disposed on a bottom of the CPU package 53. The general MLCC 20 for mid-frequency decoupling may be directly disposed on a top or bottom of the motherboard 55 in the vicinity of the CPU packages 51 and 53, or installed on the bottom of the CPU package 53.

As described above, to form the multi-stage PDN, the capacitors 10 and 20 of different structures according to each frequency range should be employed. Accordingly, mounting surfaces or mounting positions of the capacitor need to be different according to the each frequency range. Moreover, a greater number of the chip capacitors 10 and 20 are required to lower total impedance of the PDN to a target impedance or less.

SUMMARY OF THE INVENTION

An aspect of the present invention provides a multilayer chip capacitor capable of reducing a PDN impedance to a target impedance or less in a broad frequency range of hundreds of kHz to hundreds of MHz with a smaller number of capacitors.

According to an aspect of the present invention, there is provided a multilayer chip capacitor including: a capacitor body having a plurality of dielectric layers laminated therein, the capacitor body comprising first and second capacitor units arranged therein; and first to fourth outer electrodes formed on an outer surface of the capacitor body, wherein the first capacitor unit includes first and second inner electrode opposing each other while interposing a corresponding one of the dielectric layers, the first and second inner electrodes connected to the first and second outer electrodes, respectively to have polarity different from each other, and the first capacitor unit includes a plurality of capacitor elements each having a pair of the first and second inner electrodes repeatedly laminated, the second capacitor unit includes third and fourth inner electrodes opposing each other while interposing another corresponding one of the dielectric layers, the third and fourth inner electrodes connected to the third and fourth outer electrodes, respectively to have polarity identical to the first and second inner electrodes, and the second capacitor unit includes at least one capacitor element having a pair of the third and fourth inner electrodes repeatedly laminated, and at least one of the capacitor elements of the first capacitor unit is different from the other capacitor elements of the first capacitor unit in a lamination number of the first and second inner electrodes or a resonant frequency.

The plurality of capacitor elements of the first capacitor unit may be arranged alternately with the at least one capacitor element of the second capacitor unit in a laminated direction of the dielectric layers.

A corresponding one of the capacitor elements of the first capacitor unit may be disposed in a lowermost part of the capacitor body.

Out of the plurality of capacitor elements of the first capacitor unit, a corresponding one of the capacitor element having a smallest lamination number of the first and second inner electrodes may be disposed in a lowermost part of the first capacitor unit. The at least one of capacitor elements of the second capacitor may include a plurality of capacitor elements, and out of the plurality of capacitor elements of the second capacitor unit, a corresponding one of the capacitor elements having a smallest lamination number of the third and fourth inner electrodes may be disposed in a lowermost part of the second capacitor unit.

The first and second inner electrodes may include leads for connecting the first and second outer electrodes thereto, respectively, and at least one of the capacitor elements of the first capacitor unit is different from the other capacitor elements of the first capacitor unit in a width of the leads of the first and second inner electrodes.

The first and second inner electrodes may include leads for connecting the first and second outer electrodes thereto, respectively, and at least one of the capacitor elements of the first capacitor unit may be different from the other capacitor elements of the first capacitor unit in the number of the leads of the first and second inner electrodes.

The at least one capacitor element of the second capacitor unit may include a plurality of capacitor elements, wherein at least one of the capacitor elements of the second capacitor unit is different from the other capacitor elements of the second capacitor unit in a lamination number of the third and fourth inner electrodes or a resonant frequency. The third and fourth inner electrodes may include leads for connecting the third and fourth outer electrodes thereto, respectively, and at least one of the plurality of capacitor elements of the second capacitor unit is different from the other capacitor elements of the second capacitor unit in a width of the leads of the third and fourth inner electrodes. The third and fourth inner electrodes may include leads for connecting the third and fourth outer electrodes are connected thereto, respectively, and at least one of the plurality of capacitor elements of the second capacitor unit is different from the other capacitor elements of the second capacitor unit in the number of the leads of the third and fourth inner electrodes.

The one pair of first and second inner electrodes in the first capacitor unit may define one layer, and the one pair of third and fourth inner electrodes in the second capacitor unit may define another layer, wherein an equivalent series inductance (ESL) per layer of the first and second inner electrodes is smaller than an equivalent series inductance per layer of the third and fourth inner electrodes.

The first to fourth inner electrodes may include leads for connecting the first to fourth outer electrodes thereto, respectively, wherein the leads of the first and second inner electrodes have widths greater than widths of the leads of the third and fourth inner electrodes.

The first and second capacitor units may be electrically insulated from each other.

The multilayer chip capacitor may include a four-terminal capacitor including a respective one of the first to fourth outer electrodes. The first to fourth inner electrodes may be connected to the first to fourth outer electrodes through one lead, respectively. The first and second outer electrodes may be formed on opposing first and second longer side surfaces of the capacitor body, respectively and the third and fourth outer electrodes are formed on opposing first and second shorter side surfaces of the capacitor body, respectively. The first and second outer electrodes may be formed on a first longer side surface and a first shorter side surface adjacent to each other in the capacitor body, respectively, and the third outer electrode may be formed on a second longer side surface opposing the first longer side surface and the fourth outer electrode may be formed on a second shorter side surface opposing the first shorter side surface.

Each of the third and fourth outer electrodes may include two outer electrodes, and the first and second outer electrodes may be formed on opposing first and second longer side surfaces of the capacitor body, and the respective two third and fourth outer electrodes may be formed on the first and second longer side surfaces, respectively. The first outer electrode may be formed between the two third outer electrodes and the second outer electrode may be formed between the two fourth outer electrodes. Each of the first and second outer electrodes may include two outer electrodes.

Each of the third and fourth outer electrodes may include two outer electrodes, the first and second outer electrodes may be formed on opposing first and second longer side surfaces of the capacitor body, respectively, and the respective two third and fourth outer electrodes may be formed on the second and first longer side surfaces, respectively. The first outer electrode may be formed between the two fourth outer electrodes and the second outer electrode may be formed between the two third outer electrodes.

Each of the first and second outer electrodes may include two outer electrodes, wherein respective single ones of the first and second outer electrodes are formed on opposing first and second longer side surfaces of the capacitor body, respectively, and each of the third and fourth outer electrodes comprises two outer electrodes, wherein respective single ones of the third and fourth outer electrodes are formed on the opposing first and second longer side surfaces of the capacitor body, respectively. On each of the first and second longer side surfaces, the first and second outer electrodes may be disposed between the third and fourth outer electrodes. Corresponding ones of the outer electrodes adjacent to each other on the first and second longer side surfaces, respectively may have polarities different form each other.

Each of the first and second outer electrodes may include four outer electrodes and respective two of the first and second outer electrodes may be formed on opposing first and second longer side surfaces, respectively, and the third and fourth outer electrodes are formed on opposing first and second shorter side surfaces of the capacitor body. The first and second outer electrodes may be arranged alternately on the first and second longer side surfaces, respectively. Each of the first and second inner electrodes may includes four leads through which the first and second outer electrodes are connected thereto, the leads of the first inner electrodes are arranged adjacent to the leads of the second inner electrodes in an interdigitated configuration to be connected to corresponding ones of the outer electrodes having identical polarity.

Each of the first and second inner electrodes may include two leads led out to the first and second longer side surfaces, respectively and connected to the first and second outer electrodes, respectively, in the each of the first and second inner electrodes, a corresponding one of the leads led out to the first longer side surface is arranged shifted to a position corresponding to the outer electrode immediately adjacent thereto, with respect to another corresponding lead led out to the second longer side surface, and in the first capacitor unit, the leads led out to each of the first and second longer side surfaces are arranged in a zigzag shape with respect to each other along a laminated direction from the longer side surface.

According to another aspect of the present invention, there is provided a multilayer chip capacitor including: a capacitor body having a plurality of dielectric layers laminated therein, the capacitor body including first and second capacitor units arranged therein; and first to fourth outer electrodes formed on an outer surface of the capacitor body, wherein the first capacitor unit includes first and second inner electrode opposing each other while interposing a corresponding one of the dielectric layers, the first and second inner electrodes connected to the first and second outer electrodes, respectively to have polarity different from each other, and the first capacitor unit includes a plurality of capacitor elements each having a pair of the first and second inner electrodes repeatedly laminated, the second capacitor unit includes third and fourth inner electrodes opposing each other while interposing another corresponding one of the dielectric layers, the third and fourth inner electrodes connected to the third and fourth outer electrodes, respectively to have polarity identical to the first and second inner electrodes, and the second capacitor unit includes a plurality of capacitor elements each having a pair of the third and fourth inner electrodes repeatedly laminated, and at least one of the capacitor elements of the second capacitor unit is different from the other capacitor elements of the first capacitor unit in a lamination number of the first and second inner electrodes or a resonant frequency.

The plurality of capacitor elements of the first capacitor unit may be arranged alternately with the plurality of capacitor elements of the second capacitor unit in a laminated direction of the dielectric layers.

Out of the plurality of capacitor elements of the second capacitor unit, a corresponding one of the capacitor elements having a smallest lamination number of the third and fourth inner electrodes may be disposed in a lowest part of the second capacitor unit.

The third and fourth inner electrodes may include leads for connecting the third and fourth outer electrodes thereto, respectively, and at least one of the capacitor elements of the second capacitor unit is different from the other capacitor elements of the second capacitor unit in a width of the leads of the third and fourth inner electrodes.

The third and fourth inner electrodes may include leads for connecting the third and fourth outer electrodes thereto, respectively, and at least one of the capacitor elements of the second capacitor unit is different from the other capacitor elements of the second capacitor unit in the number of the leads of the third and fourth inner electrodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
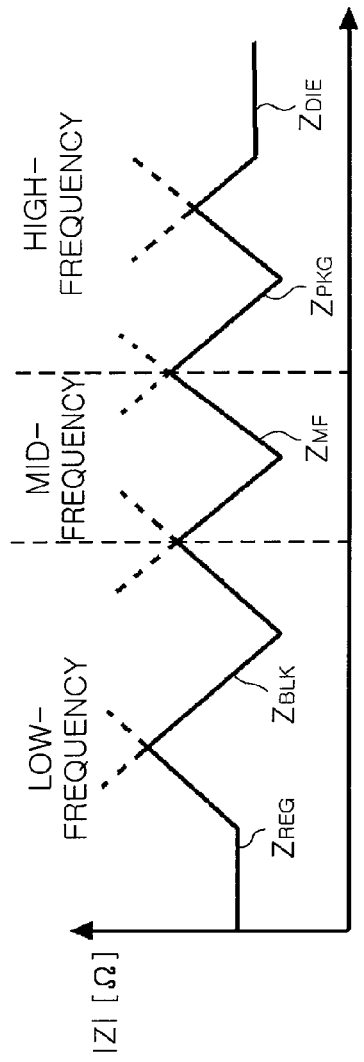
FIG. 1 is a graph schematically illustrating magnitude of impedance Z with respect to frequency of a conventional multi-stage power distribution network (PDN)
Figure 2:
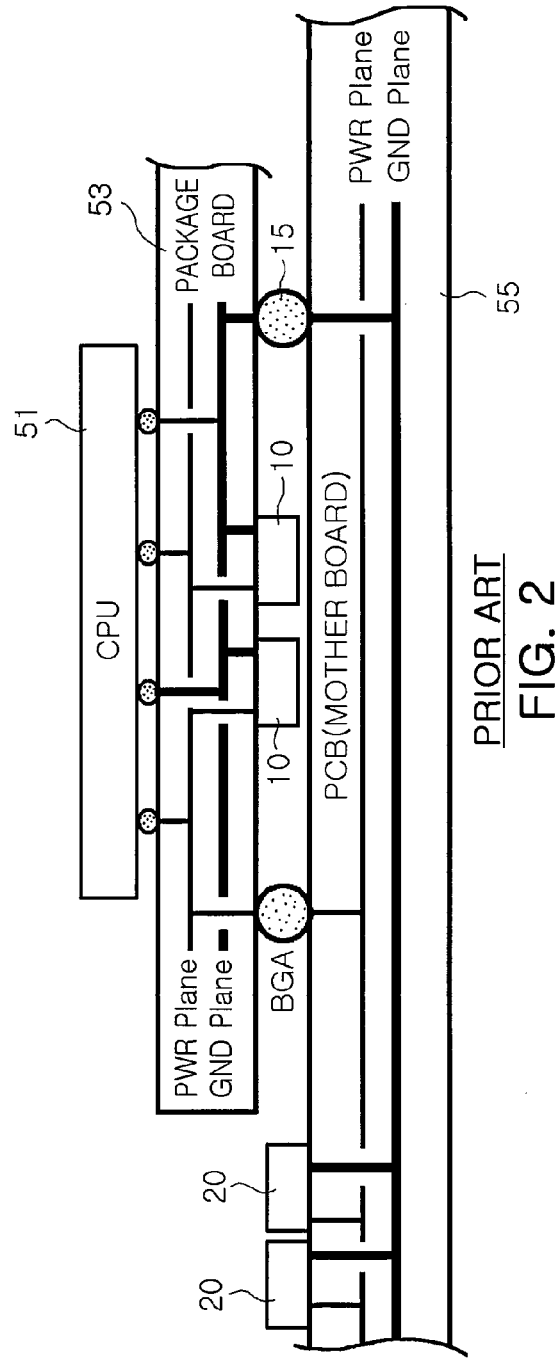
FIG. 2 schematically illustrates a motherboard apparatus a motherboard apparatus in which conventional decoupling capacitors are connected to micro processor unit (MPU)

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 3:
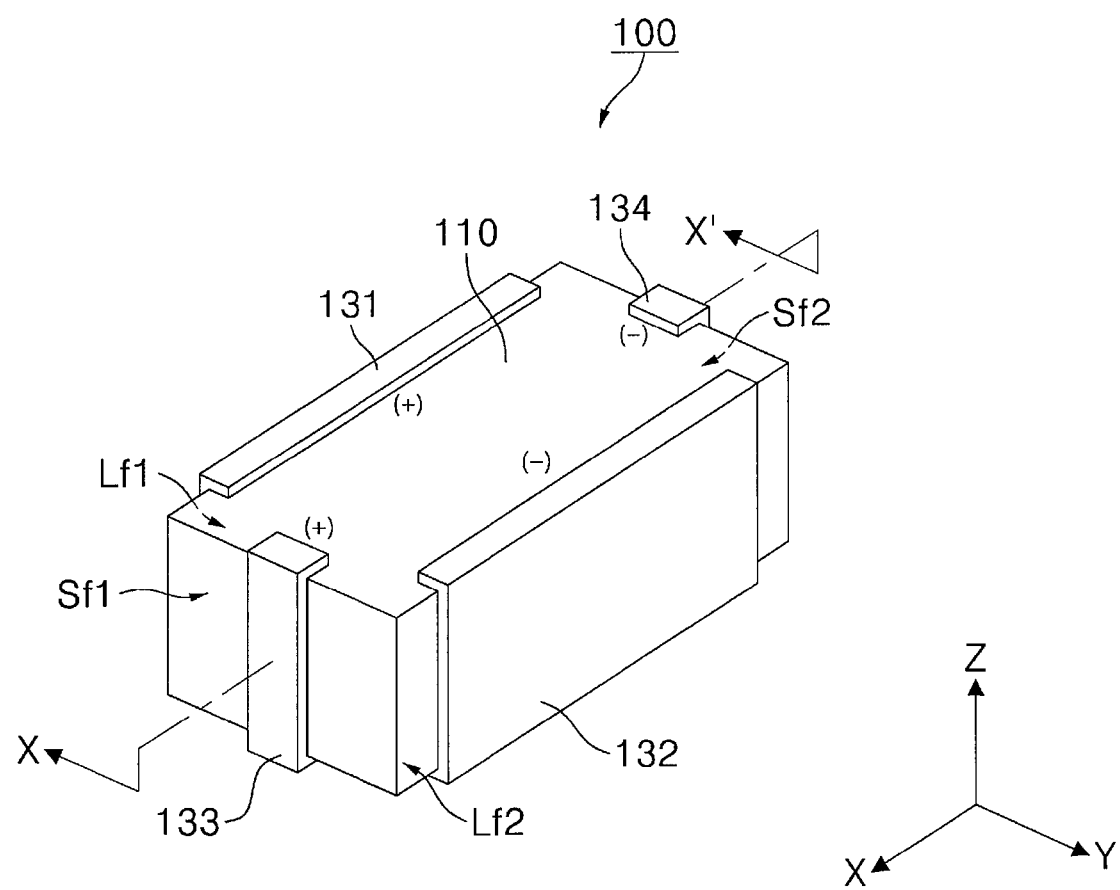
FIG. 3 is a perspective view illustrating an appearance of a multilayer chip capacitor according to an exemplary embodiment of the invention.
Figure 4:
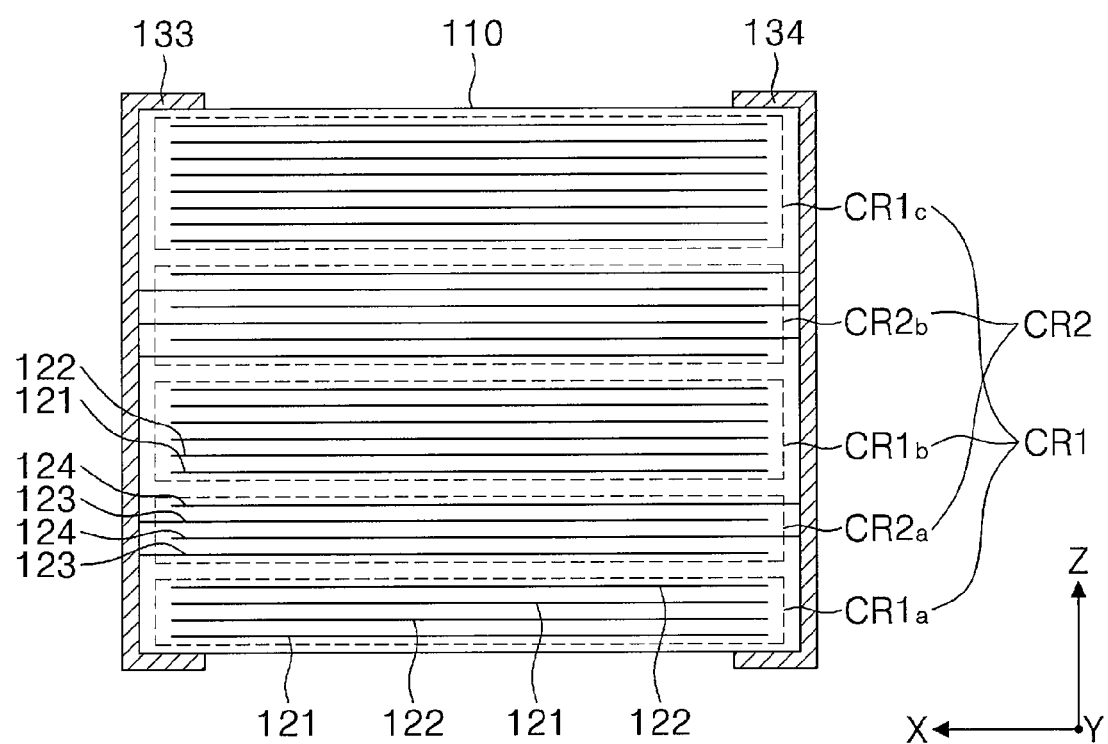
FIG. 4 is a cross-sectional view of the multilayer chip capacitor of FIG. 3, taken along the line X-X'.
Figure 5:
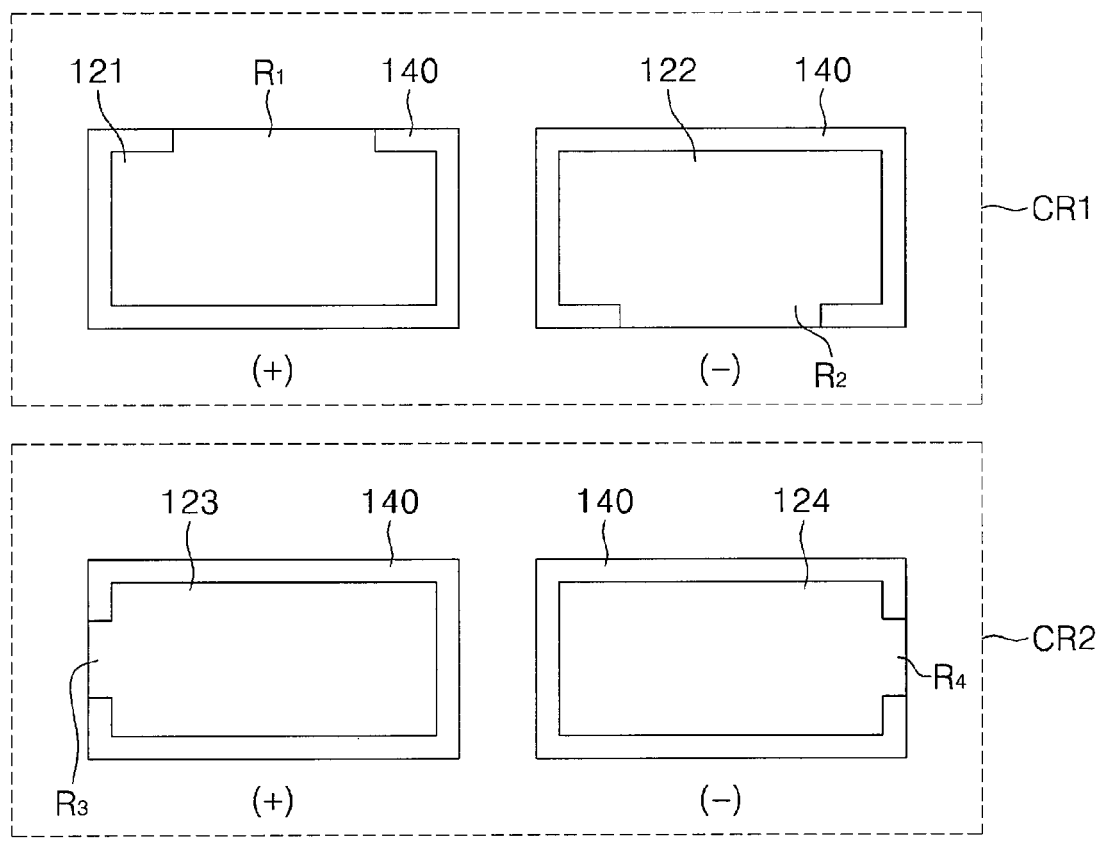
FIG. 5 is a plan view illustrating an inner electrode structure of the capacitor shown in FIG. 3.

FIG. 3 is a perspective view illustrating an appearance of a multilayer chip capacitor according to an exemplary embodiment of the invention. FIG. 4 is a cross-sectional view of the multilayer chip capacitor of FIG. 3, taken along the line X-X'. FIG. 5 is a plan view illustrating an inner electrode structure of the capacitor shown in FIG. 3

Referring to FIGS. 3 to 5, the capacitor 100 includes a capacitor body 110 shaped as a rectangular parallelepiped, and first to fourth outer electrodes 131, 132, 134, and 134 formed on side surfaces of the body. The capacitor body 110 has a plurality of dielectric layers (140 of FIG. 5) laminated therein, and first to fourth inner electrodes 121, 122, 123, and 124 are arranged alternately while interposing a corresponding one of the dielectric layers. The first and second outer electrodes 131 and 132 are disposed on opposing longer ones of the side surfaces Lf1 and Lf2 of the body 110. The third and fourth outer electrodes 133 and 134 are disposed on opposing shorter ones of the side surfaces Sf1 and Sf2.

Here, as shown in FIG. 3, the first and third outer electrodes 131 and 133 have positive (+) polarity and the second and fourth outer electrodes 132 and 134 have negative (−) polarity. The first and second inner electrodes 121 and 122 constitute a first capacitor unit CR1 and the third and fourth inner electrodes 123 and 124 constitute a second capacitor unit CR2. Meanwhile, the multilayer chip capacitor 100 is formed of a four terminal multilayer chip capacitor (MLCC) having the four outer electrodes in total but the present invention is not limited thereto.

As shown in FIG. 4, the capacitor body 110 is divided into the first and second capacitor units CR1 and CR2 and the first and second capacitor units CR1 and CR2 are electrically insulated from each other. The first capacitor unit CR1 includes the first and second inner electrodes 121 and 122 arranged to oppose each other and have different polarities while interposing a corresponding one of the dielectric layers 140. The first and second inner electrodes 121 and 122 are connected to only the first and second outer electrodes 131 and 132, respectively. The second capacitor unit CR2 includes the third and fourth inner electrodes 123 and 124 arranged to oppose each other and have different polarities while interposing another corresponding one of the dielectric layers 140. The third and fourth inner electrodes 123 and 124 are connected to only the third and fourth electrodes 133 and 134, respectively. Therefore, in the multilayer chip capacitor 100, the first capacitor unit CR1 and the second capacitor unit CR2 are electrically insulated from each other. That is, before being mounted on the circuit board, the first capacitor unit CR1 and the second capacitor unit CR2 are not electrically connected together.

The first capacitor unit CR1 includes first to third capacitor elements CR1a to CR1c arranged at a distance from one another in a laminated direction of the dielectric layers 140. That is, the plurality of capacitor elements CR1a to CR1c are spatially separated from one another to constitute the first capacitor unit CR1. Likewise, the second capacitor unit CR2 includes fourth and fifth capacitor elements CR2a and CR2b arranged at a distance from each other in a laminated direction of the dielectric layers 140. Here, the first to third capacitor elements CR1a to CR1c constituting the first capacitor unit CR1 alternate with the fourth and fifth capacitor elements CR2a and CR2b constituting the second capacitor unit CR2. In the present embodiment, the first capacitor unit CR1 includes three capacitor elements and the second capacitor unit CR2 includes two capacitor elements. However, the number of capacitor elements of the first and second capacitor units may be increased or decreased.

At least one of the first to third capacitor elements CR1a to CR1c of the first capacitor unit CR1 is different from the other capacitor elements in a lamination number of the inner electrodes, i.e., first and second inner electrodes, and thus may have a capacitance different from the others. In the same manner, the fourth and fifth capacitor elements CR2a and CR2b constituting the second capacitor unit CR2 are different from each other in a lamination number of the inner electrodes. i.e., third and fourth inner electrodes, and thus may have a capacitance different from the others. Specifically, in the first capacitor unit CR1, the first capacitor element CR1a has a smaller lamination number than the second and third capacitor elements CR2 and CR3 and the second capacitor element CR2 has a smaller lamination number than the third capacitor element CR3. In the second capacitor unit CR2, the fifth capacitor element CR2b has a greater lamination number than the fourth capacitor element CR2a.

Accordingly, the first and second capacitor units CR1 and CR2 each include at least one capacitor element whose resonant frequency SRF is different from the others. However, in order to vary a resonant frequency of the capacitor elements, equivalent series inductance (ESL) of the capacitor elements may be adjusted, in place of changing the lamination number of the inner electrodes. Also, unlike the present embodiment, only one of the first and second capacitor units CR1 and CR2 may be configured to include a capacitor element different from the other capacitor elements in a resonant frequency (SRF).

As described above, the multilayer chip capacitor 100 of the present embodiment includes the first and second capacitor units CR1 and CR2 electrically insulated from each other. Also, the first and second capacitor units CR1 and CR2 each include a plurality of capacitor elements spatially separated from one another. Here, the plurality of capacitor elements of the each of the first and second capacitor units CR1 and CR2 each have the inner electrodes laminated in a different number. This yields the effect that the multilayer chip capacitor 100 includes at least three capacitor elements in a single chip.

Referring to FIG. 5, the first to fourth inner electrodes 121 to 124 are connected to corresponding ones of the outer electrodes 131 to 134 by leads R1 to R4, respectively. The lead R1 of the first inner electrode has a width identical to a width of the lead R2 of the second inner electrode. The lead R3 of the third inner electrode has a width identical to a width of the lead R4 of the fourth inner electrode. Here, in the first capacitor unit CR1, the leads R1 and R2 of the inner electrodes 121 and 122 vertically adjacent to each other and having different polarities have a small distance from each other. On the other hand, in the second capacitor unit CR2, the leads R3 and R4 of the inner electrodes 123 and 124 vertically adjacent to each other and having different polarities have a relatively great distance from each other. This allows the first capacitor unit CR1 to have an equivalent series inductance (ESL) per layer lower than an ESL per layer of the second capacitor unit CR2. Here, the ESL per layer denotes an ESL provided by a pair of the opposing inner electrodes adjacent to each other and having different polarities.

Accordingly, as shown in FIG. 4, the first capacitor unit CR1 including the inner electrode having a short current path and leads of great widths and thus ensuring relatively low ESL is disposed in the greater vicinity of a bottom of the capacitor body 110 than the second capacitor unit CR2. This allows a current flowing in the capacitor at a high frequency to concentrate on the inner electrodes 121 and 122 with a relatively low ESL. This shortens a current path defined by a substantial current loop to allow an overall ESL to be maintained at a lower level. Similarly, in the first and second capacitor units CR1 and CR2, a capacitor element having a relatively high resonant frequency due to a relatively small lamination number of the inner electrodes is disposed in a lower part of the capacitor body 110. That is, the first capacitor element CR1a is disposed in the lower part of the capacitor body 110.

Meanwhile, a multilayer capacitor with a low ESL has a capacitance lower than a capacitance of a general two-terminal multilayer capacitor used in an identical motherboard apparatus. Accordingly, the inner electrodes 121 and 122 of the first capacitor unit CR1 are laminated in a smaller number than the inner electrodes 123 and 124 of the second capacitor unit CR2. Consequently, this ensures that the first capacitor unit CR1 has a resonant frequency SRF higher than a resonant frequency of the second capacitor unit CR2. In this case, the first and second capacitor units CR1 and CR2 are arranged alternately with each other to prevent an increase in ESL which may occur when the second capacitor unit CR2 is disposed far away from a mounting surface.

Furthermore, in the present embodiment, the capacitor body 110 includes the first and second capacitor units CR1 and CR2 with different capacitances or resonant frequencies while capable of being prevented from a decrease in capacitance. In a case where the first and second capacitor units CR1 and CR2 are connected to identical ones of the outer electrodes, the first and second capacitor units CR1 and CR2 need to be spatially separated from each other to ensure different resonant frequencies. In the present embodiment, the first and second capacitor units CR1 and CR2 are electrically insulated from each other, thereby precluding a need for arranging the first and second capacitor units CR1 and CR2 at a predetermined distance in a laminated direction. Accordingly, this increases the number of the inner electrodes included in the capacitor body 110 and subsequently a capacitance of an entire capacitor. As described above, a distance between the first and second inner electrodes 121 and 122 in the first capacitor unit CR1 is identical to a distance between the first and second capacitor units CR1 and CR2 adjacent to each other, thereby enhancing capacitance.

In the capacitor 100 described above, the first capacitor unit CR1 serves as a conventional low ESL two-terminal MLCC, i.e., low inductance chip capacitor (LICC). Also, the second capacitor unit CR2 serves as a conventional two terminal MLCC. Therefore, the capacitor 100 integrates the conventional two-terminal MLCC and the low ESL LICC into one chip. Consequently, this single capacitor can reduce a PDN impedance to a target impedance or less in a wide frequency range, for example, hundreds of kHz to hundreds of MHz range. Particularly, as described above, the first and second capacitor units electrically insulated from each other are employed in the one chip. This results in no substantial change in the number of capacitors although the two capacitor units CR1 and CR2 are joined into one chip. This ensures the PND to be easily designed to satisfy target impedance and allows target impedance to be further satisfied.

Moreover, when the decoupling two terminal MLCC mounted on the motherboard and the decoupling low ESL MLCC mounted on the CPU package are integrated into the aforesaid capacitor 100, the number of the decoupling capacitors used in the PDN of the CPU can be significantly decreased. That is, since the second capacitor unit CR2 of the capacitor 100 performs mid-frequency decoupling, an additional two-terminal MLCC is not required for mid-frequency decoupling or the necessary number of the two terminal MLCC can be diminished.

Figure 6:
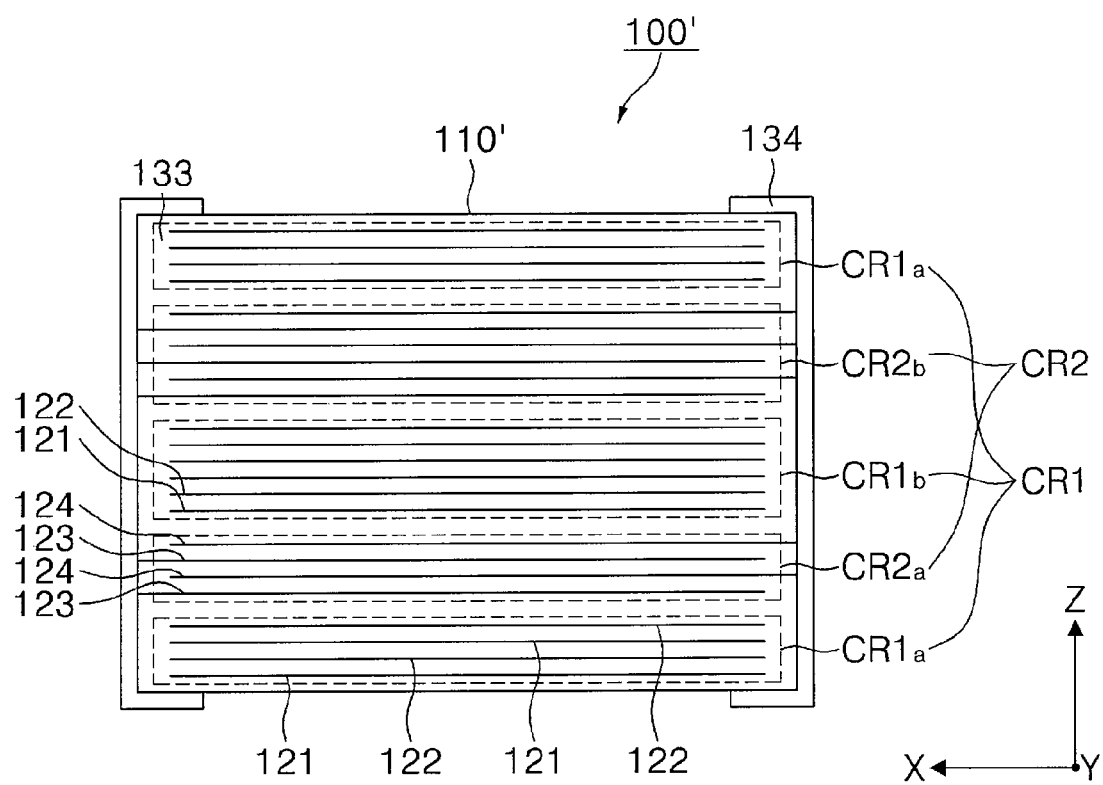
FIG. 6 is a cross-sectional view illustrating a modified example of the multilayer chip capacitor shown in FIG. 3.

FIG. 6 is a cross-sectional view illustrating a modified example of the multilayer chip capacitor shown in FIG. 3. A multilayer chip capacitor 100' of FIG. 6 is shaped identically to the capacitor of FIG. 3 and can be compared with a cross-sectional view of FIG. 4. In the present embodiment, first capacitor elements CR1a of a first capacitor unit CR1 are arranged symmetrically in upper and lower parts of a capacitor body 110'. That is, in this configuration, inner electrodes of the third capacitor element CR1c of FIG. 4 are laminated in an identical number to inner electrodes of the first capacitor elements CR1a. Accordingly, this imparts symmetry to upper and lower parts of the multilayer chip capacitor 100', thereby allowing the capacitor 100' to be mounted symmetrically. This ensures that the capacitor 100' can be mounted on a circuit board without a need for distinguishing top and bottom of the capacitor.

Figure 7:
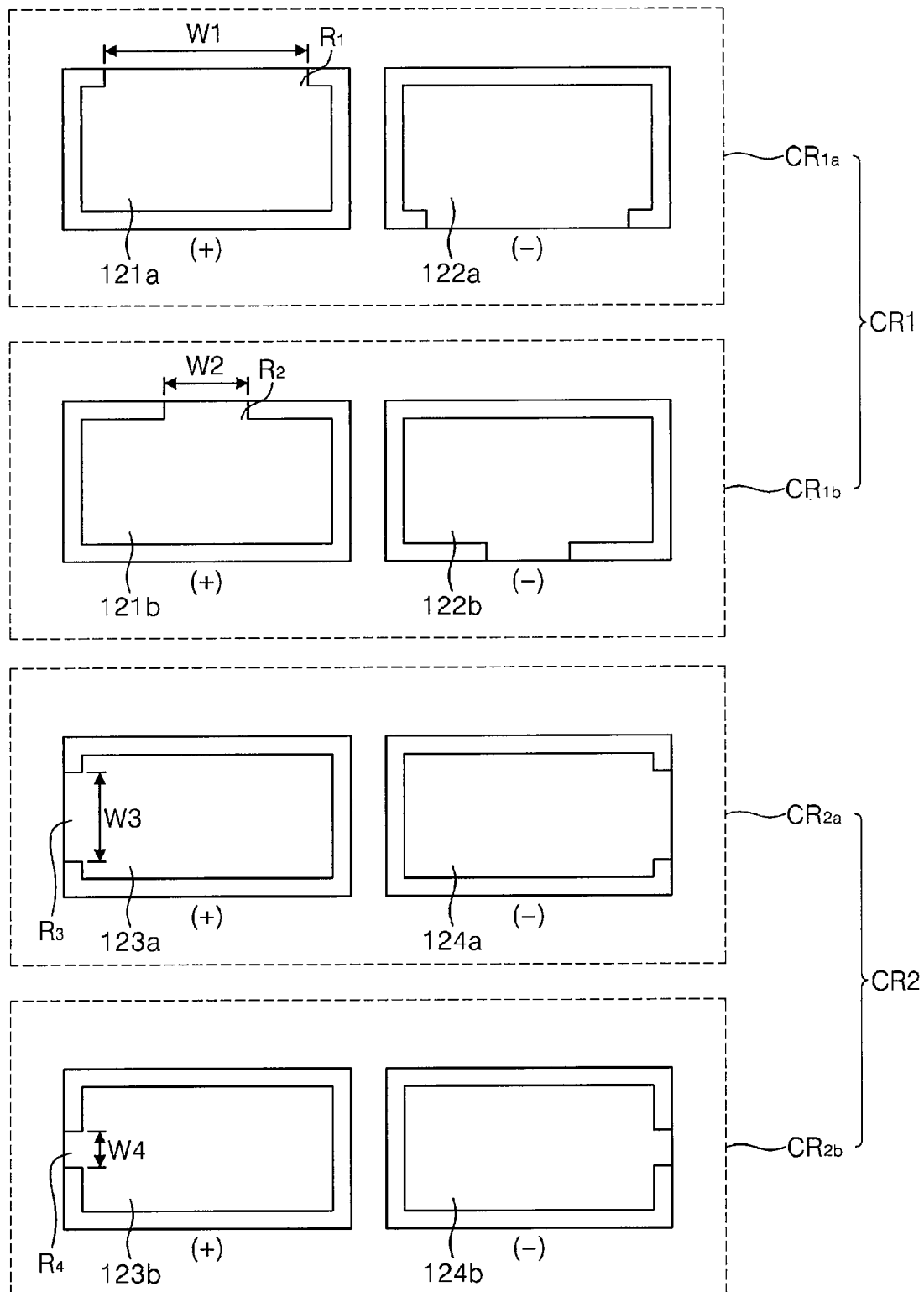
FIG. 7 is a plan view illustrating an inner electrode structure according to a modified example of the multilayer chip capacitor shown in FIG. 3.

FIG. 7 is a plan view illustrating an inner electrode structure according to a modified example of the multilayer chip capacitor shown in FIG. 3. Referring to FIG. 7, in a first capacitor unit CR1, first and second inner electrodes 121a and 122a of a first capacitor element CR1a each include a lead R1 and first and second inner electrodes 121b and 122b of a second capacitor element CR1b each include a lead R2. Here, the leads R1 of the first capacitor element CR1a have widths W1 greater than widths W2 of the leads R2 of the second capacitor element CR1b. An increase in widths of the leads may lead to a decrease in ESL. Therefore, as shown in FIG. 7, the leads R1 of the first capacitor element CR1a may be increased in width W1.

Likewise, in the second capacitor unit CR2, third and fourth inner electrodes 123a and 124a of a fourth capacitor element CR2a each include a lead R3 and third and fourth inner electrodes 123b and 124b of a fifth capacitor element CR2b each include a lead R4. Here, the leads R3 of the fourth capacitor element CR2a have widths W3 greater than widths W4 of the leads R4 of the fifth capacitor element CR2b. An increase in widths of the leads may lead to a decrease in ESL. Therefore, as shown in FIG. 7, the leads R3 of the fourth capacitor element CR2a may be increased in width W3. Meanwhile, in the present embodiment, the leads of the capacitor elements spatially separated from each other have widths different from each other. However, in the identical capacitor element, for example, the first capacitor element CR1a, the inner electrodes may include the leads whose widths are different.

Figure 8:
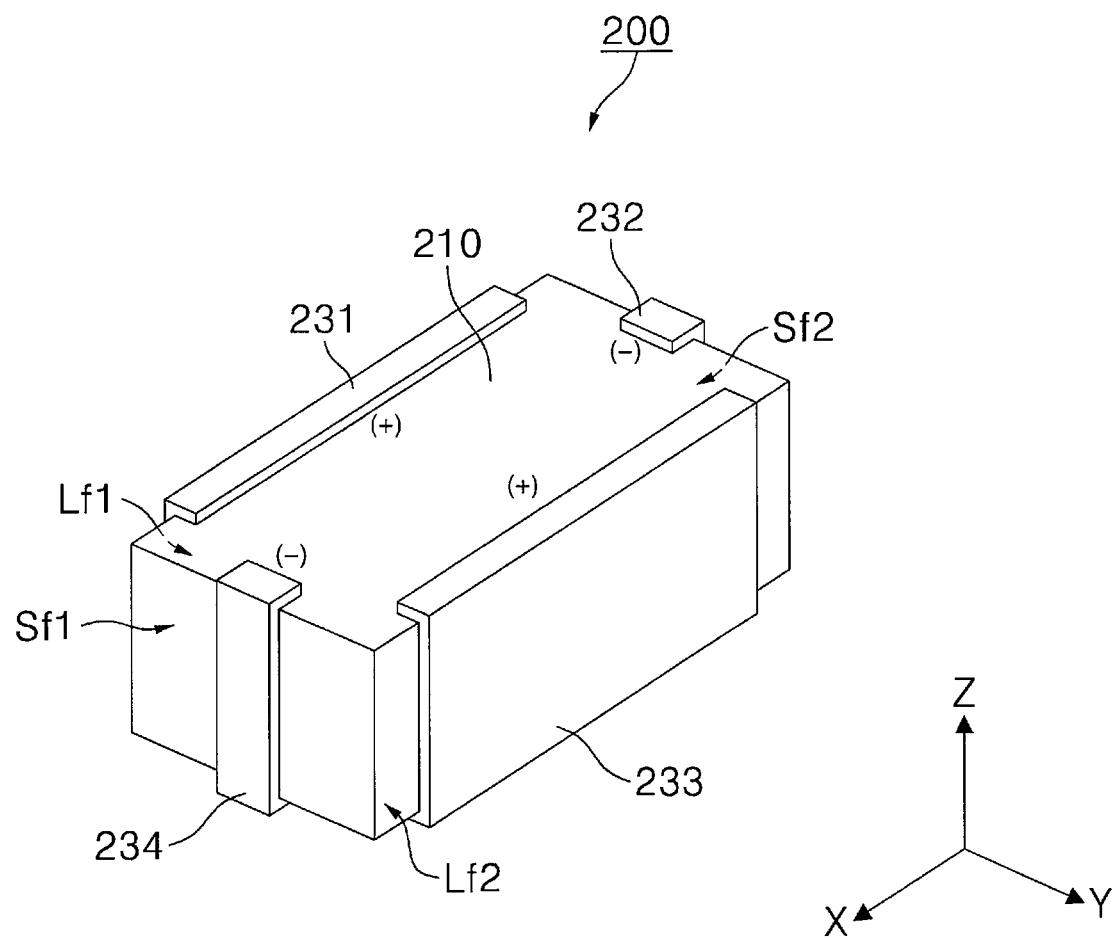
FIG. 8 is a perspective view illustrating a multilayer chip capacitor according to another exemplary embodiment of the invention.
Figure 9:
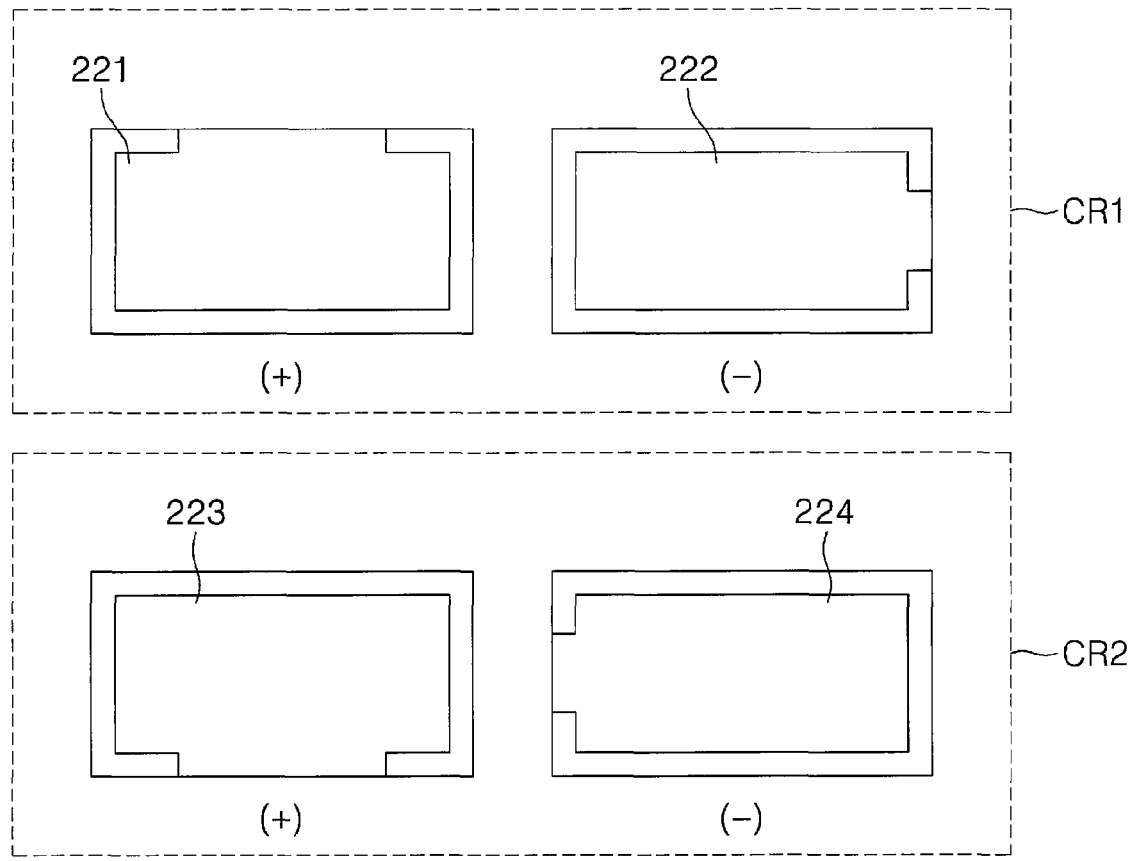
FIG. 9 is a plan view illustrating an inner electrode structure of the multilayer chip capacitor shown in FIG. 8.

FIG. 8 is a perspective view illustrating a multilayer chip capacitor according to another exemplary embodiment of the invention. FIG. 9 is a plan view illustrating an electrode structure of the multilayer chip capacitor shown in FIG. 8. First, referring to FIG. 8, the multilayer chip capacitor 200 of the present embodiment is shaped identically to the capacitor of FIG. 3 but different in the arrangement of the outer electrodes. As for first and second outer electrodes 231 and 232 connected to the first capacitor unit CR1, the first outer electrode 231 of positive (+) polarity is formed on a first longer side surface Lf1 of the capacitor body 210. The second outer electrode 232 of negative (−) polarity is formed on a second shorter side surface Sf2. As for third and fourth outer electrodes 233 and 234 connected to the second capacitor unit CR2, the third outer electrode 233 of positive (+) polarity is formed on the second longer side surface Lf2 of the capacitor body 210 and the fourth outer electrode 234 of a negative (−) polarity is formed on the first shorter side surface Sf1. Accordingly, this allows the inner electrodes to be configured differently from the previous embodiment.

That is, referring to FIG. 9, the first and second inner electrodes 221 and 222 of the first capacitor unit CR1 are connected to the first and second outer electrodes 231 and 232, respectively. The first and second inner electrodes 221 and 222 of the first capacitor unit CR1 are shaped as shown in FIG. 9 due to the first and second outer electrodes 231 and 232 formed on the first longer side surface Lf1 and the second shorter side surface Sf2 of the capacitor body 210, respectively as described above. In the same manner, the third and fourth inner electrodes 223 and 224 of the second capacitor unit CR2 are disposed as depicted in a lower part of FIG. 11. In the present embodiment, a current flows through each of the inner electrodes 221 to 224 on a shorter current path, compared with the embodiment of FIG. 5. Accordingly, this further reduces ESL in each of the capacitor elements.

Figure 10:
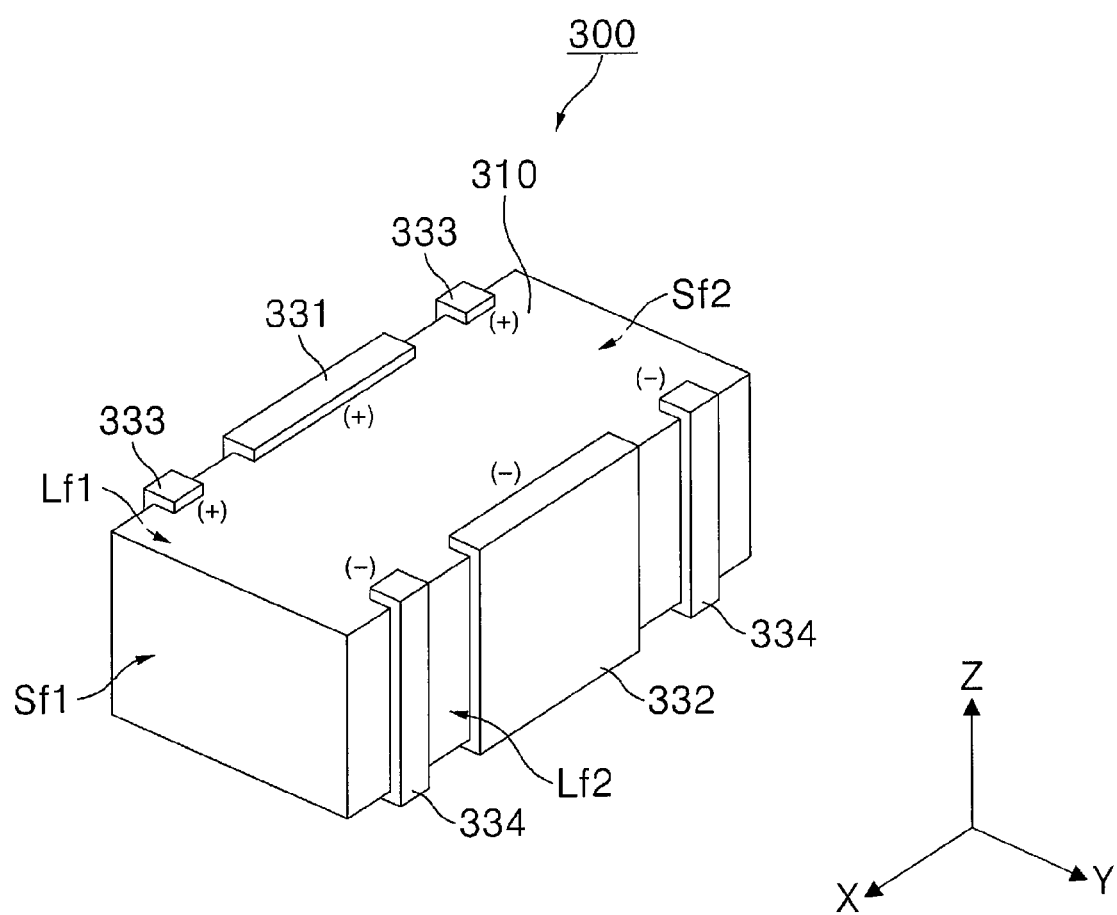
FIG. 10 is a perspective view illustrating a multilayer chip capacitor according to still another exemplary embodiment of the invention.
Figure 11:
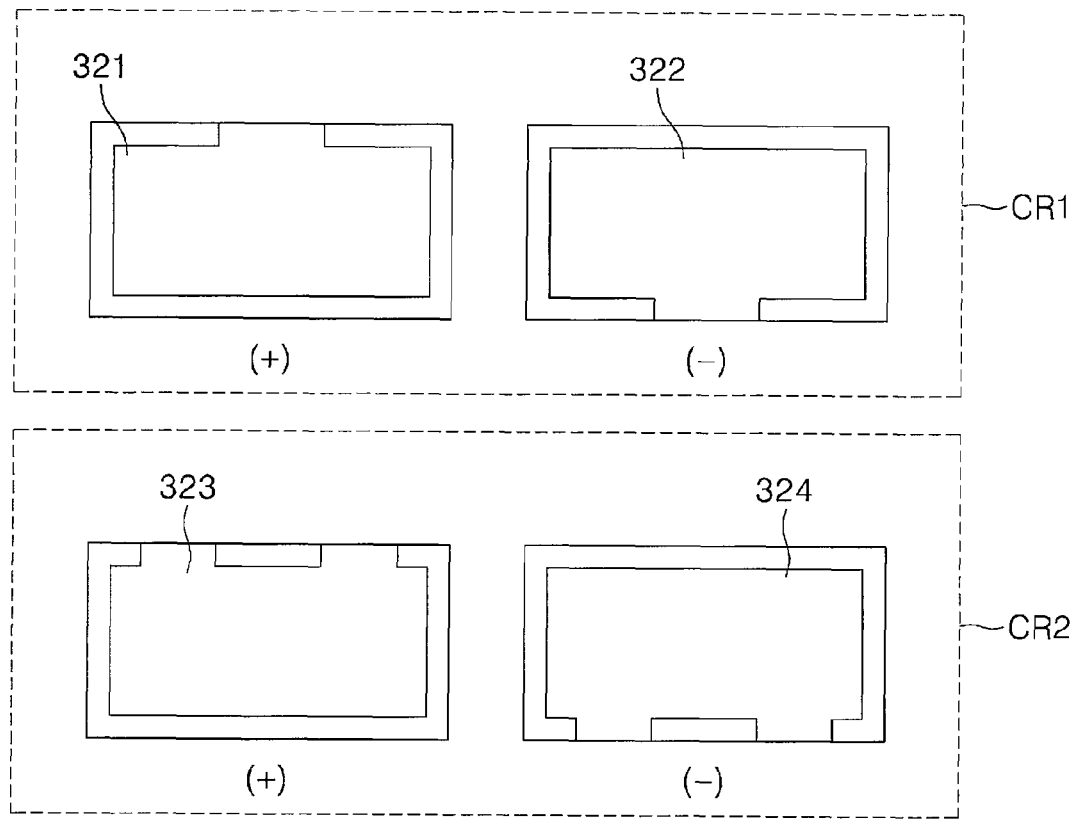
FIG. 11 is a plan view illustrating an inner electrode structure of the multilayer chip capacitor shown in FIG. 10.
Figure 12:
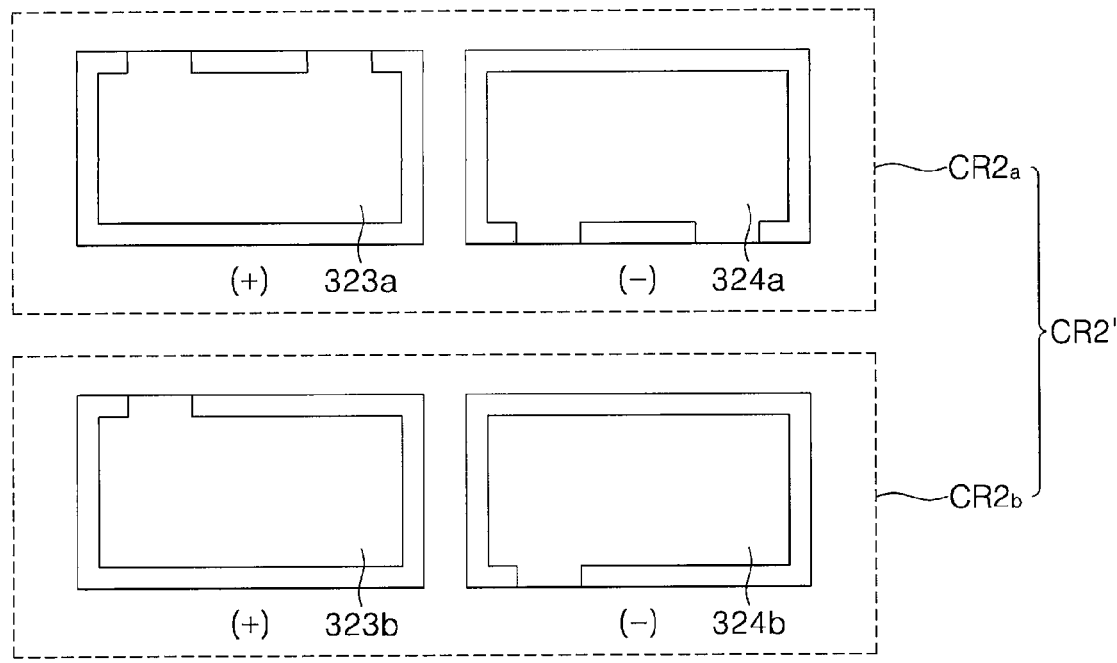
FIG. 12 is a plan view illustrating an inner electrode structure of the multilayer chip capacitor shown in FIG. 10.
Figure 13:
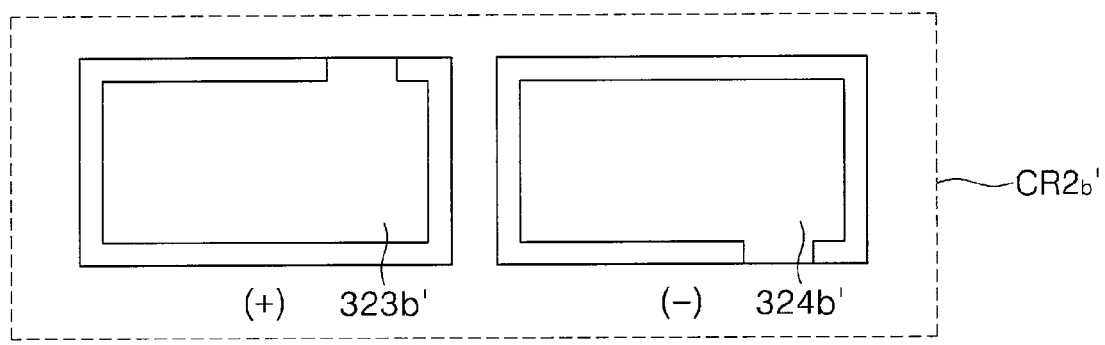
FIG. 13 is a plan view illustrating an inner electrode structure of the multilayer chip capacitor shown in FIG. 10.

FIG. 10 is a perspective view illustrating a multilayer chip capacitor according to still another exemplary embodiment of the invention. FIGS. 11 to 13 are plan views illustrating an inner electrode structure of the multilayer chip capacitor shown in FIG. 10.

Referring to FIG. 10, in the multilayer chip capacitor 300 of the present embodiment, a first outer electrode 331 with positive (+) polarity and two third outer electrodes 333 with positive (+) polarity are formed on a first longer side surface Lf1 of a capacitor body 310. Also, a second outer electrode 332 with negative (−) polarity and two four outer electrodes 334 with negative (−) polarity are formed on a second longer side surface Lf2. That is, in the present embodiment, the first and fourth outer electrodes 331 to 334 are formed only on the longer side surfaces Lf1 and Lf2 of the capacitor body 310, respectively. Here, the first outer electrode 331 is disposed between the two third outer electrodes 333 and the second outer electrode 332 is disposed between the two fourth outer electrodes 334. Also, as shown in FIG. 11, the first to fourth inner electrodes 321 to 324 include leads through which the first to fourth outer electrodes 331 to 334 are connected thereto, respectively. This arrangement of the outer electrodes and inner electrodes according to the present embodiment ensures the chip to be vertically symmetrical to each other. Meanwhile, the first and second capacitor units CR1 and CR2 are slightly different in terms of ESL, and thus unlike the previous embodiment, any of the first and second capacitor units CR1 and CR2 may be disposed first on the capacitor body 310.

Unlike FIG. 11, the inner electrodes may be configured as shown in FIGS. 12 and 13.

Referring to FIG. 12, the first and second inner electrodes 321 and 322 of the first capacitor unit CR1 are structured identically to those of FIG. 11, but the leads of the third and fourth inner electrodes of the second capacitor unit CR2' may be varied in number. That is, the inner electrodes 323a and 324a of the fourth capacitor element CR2' in the second capacitor unit CR2' each include two leads and the inner electrodes 323b and 324b of the fifth capacitor element CR2b' each include one lead. At this time, as shown in FIG. 13, the inner electrodes 323b' and 324' of the fifth capacitor element CR2b' may be varied in position. Accordingly, this allows the fourth and fifth capacitor elements CR2a' and CR2b' to differ in ESL and equivalent series resistance (ESR) from each other. Here, the fourth capacitor element CR2a' with a lower ESL may be disposed below the second capacitor unit CR2'.

The multilayer chip capacitor 300 is a six terminal multilayer chip capacitor having the outer electrodes formed only on the first and second longer side surfaces Lf1 and Lf2 to ensure higher mounting density. The present embodiment is different from the previous embodiments in the arrangement configuration of the outer electrodes and inner electrodes. The first to fourth inner electrodes 321 to 324 may be laminated identically to the previous embodiments. That is, the capacitor is divided into the first and second capacitor units CR1 and CR2 electrically insulated from each other, and the first and second capacitor units CR1 and CR2 are laminated alternately to include a plurality of capacitor elements spatially separated from one another. Here, at least one of the capacitor elements is different from the others in a lamination number of the inner electrodes. This is equally applied to embodiments of FIG. 14 to 26 which will be described below.

Figure 14:
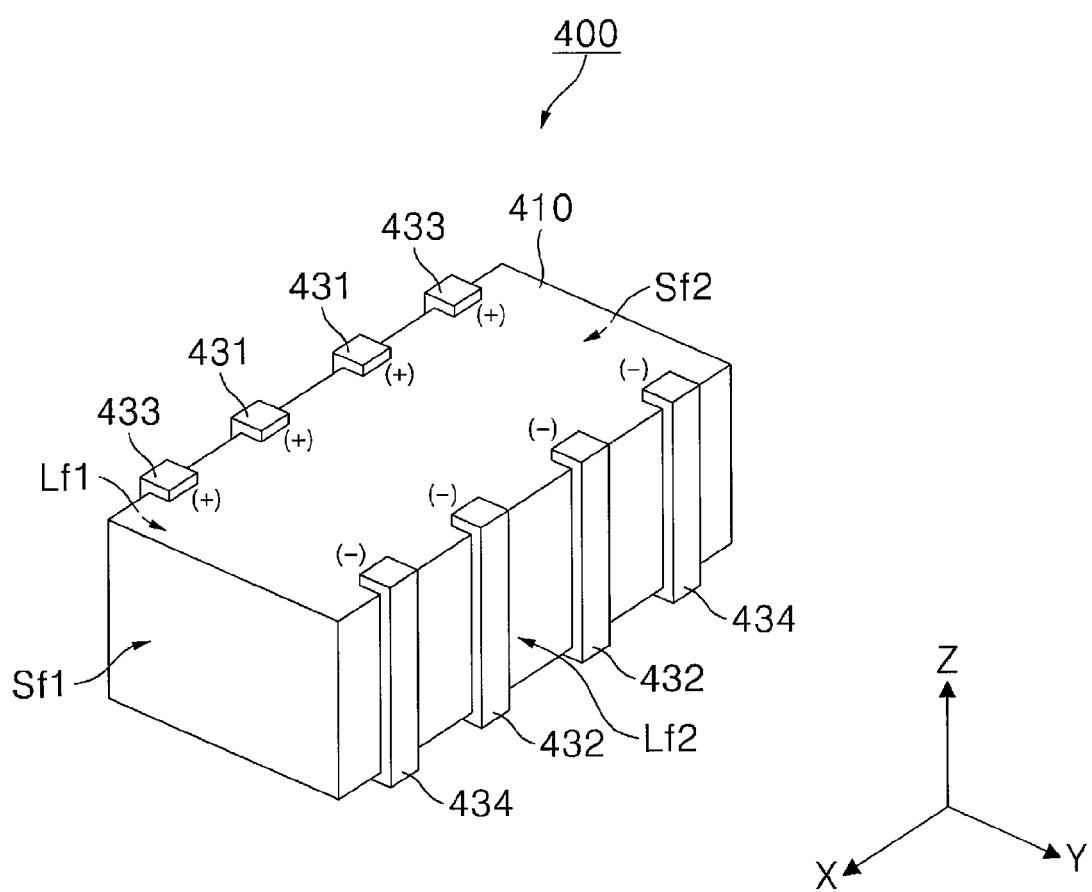
FIG. 14 is a perspective view illustrating a multilayer chip capacitor according to yet another exemplary embodiment of the invention.
Figure 15:
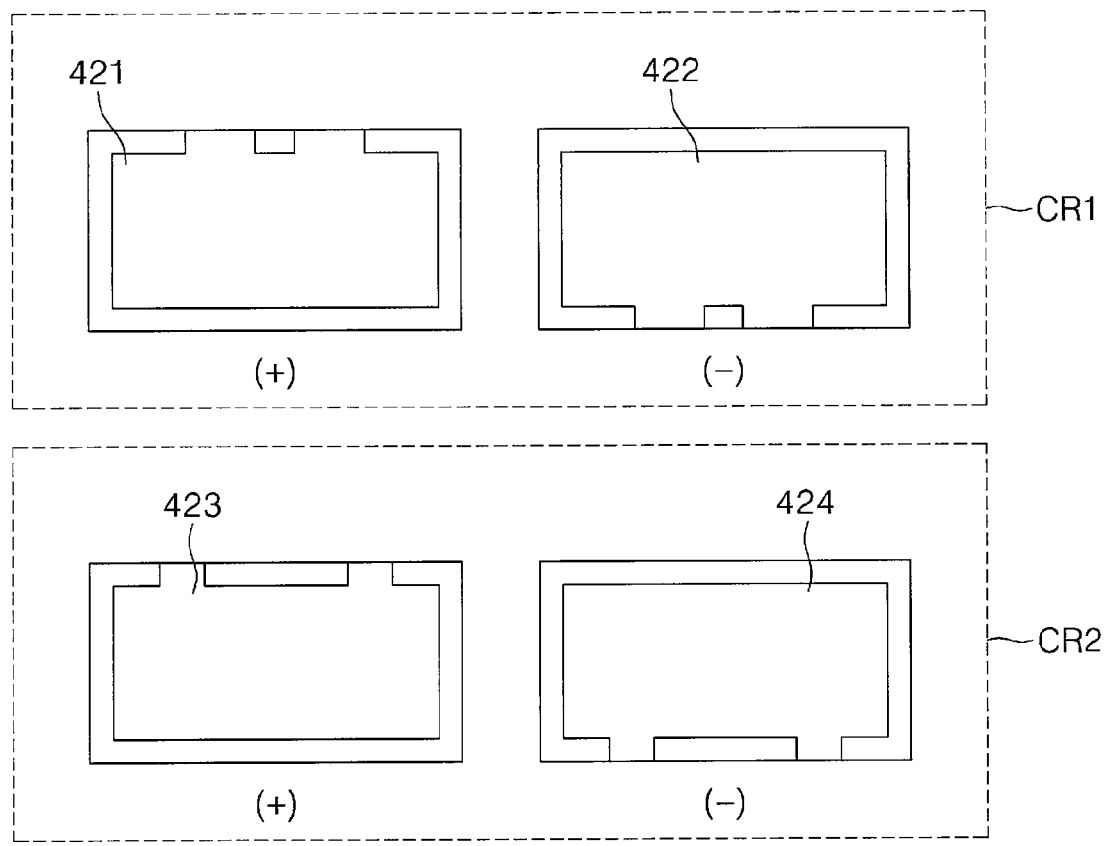
FIG. 15 is a plan view illustrating an inner electrode structure of the multilayer chip capacitor shown in FIG. 14.

FIG. 14 is a perspective view illustrating a multilayer chip capacitor according to a further exemplary embodiment of the invention. FIG. 15 is a plan view illustrating an inner electrode structure of the multilayer chip capacitor shown in FIG. 14.

Referring to FIG. 14, in the multilayer chip capacitor 400 of the present embodiment, two first outer electrodes 431 having positive (+) polarity and two third outer electrodes 433 having positive (+) polarity are formed on a first longer side surface Lf1 of the capacitor body 410. Also, two second outer electrodes 432 having negative (−) polarity and two fourth outer electrodes 434 having negative (−) polarity are formed on a second longer side surface Lf2, thereby providing an eight terminal multilayer chip capacitor (MLCC). At this time, the first outer electrodes 431 are disposed between the two third outer electrodes 433. The second outer electrodes 432 are disposed between the two fourth outer electrodes 434. Accordingly, this ensures the chip to be in vertical symmetry in the same manner as FIG. 13. Moreover, as shown in FIG. 13, first to fourth inner electrodes 421 to 424 include leads for connecting the first to fourth outer electrodes 431 to 434 thereto, respectively. Here, the first and second capacitor units CR1 and CR2 are connected to the outer electrodes formed on the longer side surfaces Lf1 and Lf2 of the capacitor body 410 and exhibit little difference in ESL. Thus, any one of the first and second capacitor units CR1 and CR2 may be disposed first. However, although not illustrated, in the same manner as the previous embodiments, the first and second inner electrodes 421 and 422 may be varied in the number of some of the leads. Likewise, the third and fourth inner electrodes 421 and 422 may be varied in the number of some of the leads.

Figure 16:
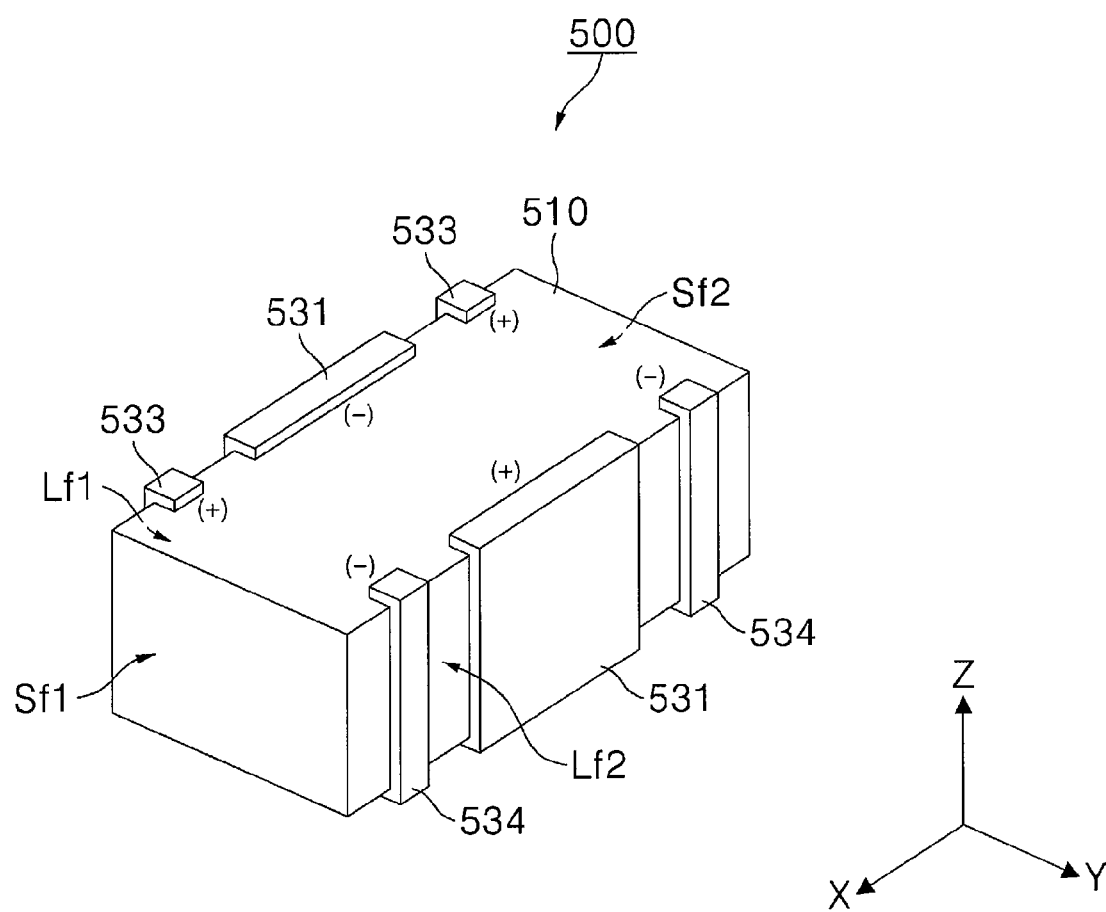
FIG. 16 is a perspective view illustrating a multilayer chip capacitor according to a further exemplary embodiment of the invention.
Figure 17:
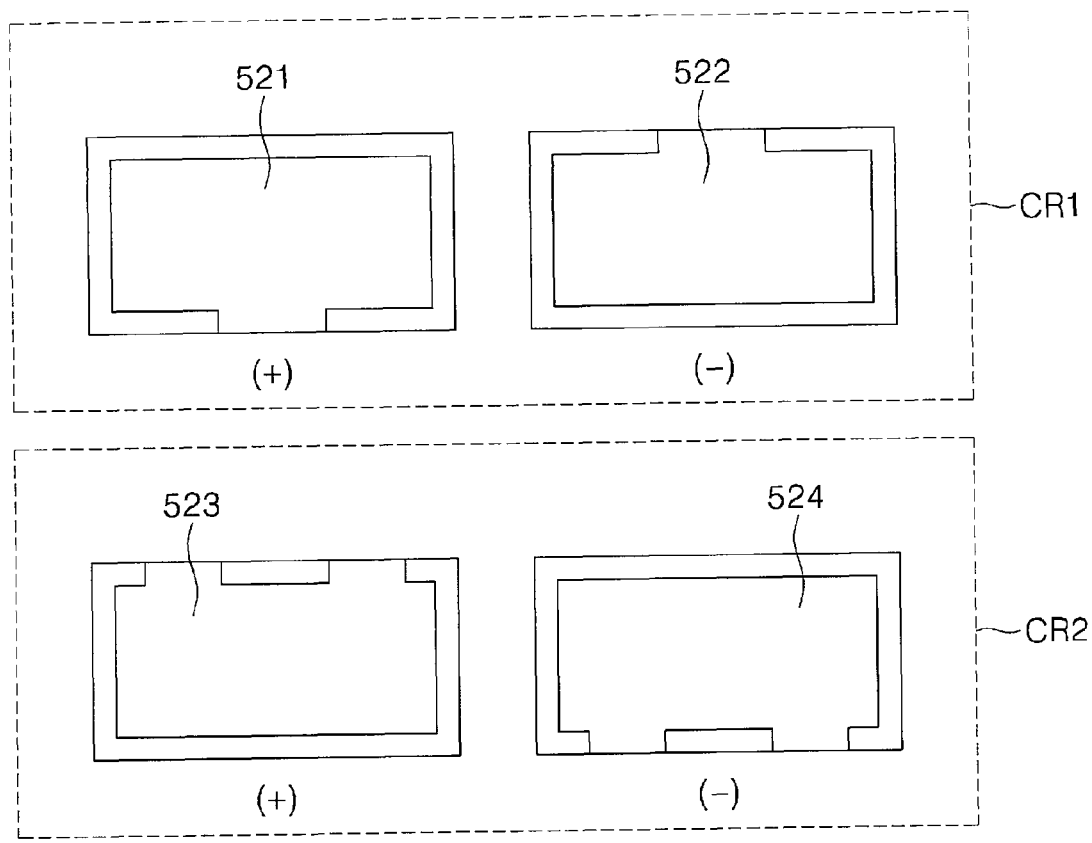
FIG. 17 is a plan view illustrating an inner electrode structure of the multilayer chip capacitor shown in FIG. 16.
Figure 18:
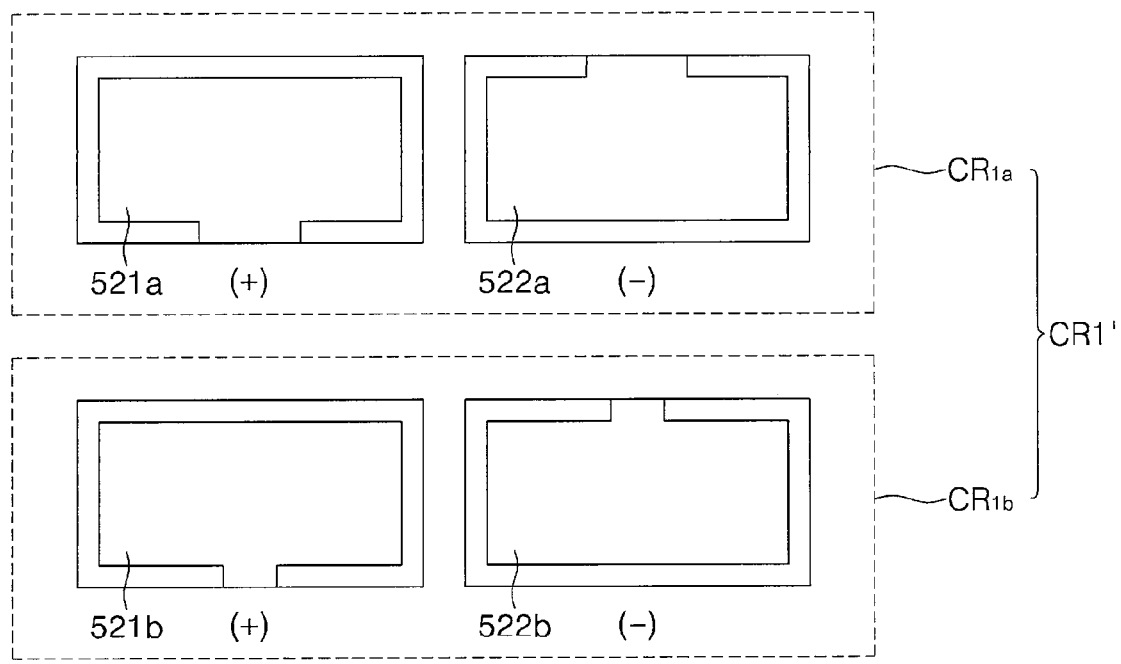
FIG. 18 is a plan view illustrating an inner electrode structure of the multilayer chip capacitor shown in FIG. 16.

FIG. 16 is a perspective view illustrating a multilayer chip capacitor according to a further exemplary embodiment of the invention. FIG. 17 is a plan view illustrating an inner electrode structure of the multilayer chip capacitor shown in FIG. 16. FIG. 18 is a plan view illustrating an inner electrode structure of the multilayer chip capacitor shown in FIG. 16.

The multilayer chip capacitor of the present embodiment is shaped identically to the multilayer chip capacitor of FIG. 10 but different in the arrangement configuration of outer electrodes and the shape of inner electrodes. Referring to FIG. 16, in the multilayer chip capacitor 500 of the present embodiment, a second outer electrode 532 having negative (−) polarity and two third outer electrodes 533 having positive (+)

polarity are formed on a first longer side surface Lf1 of a capacitor body 510. A first outer electrode 531 having positive (+) polarity and two fourth outer electrodes 534 having negative (−) polarity are formed on a second longer side surface Lf2. Here, the second outer electrode 532 is disposed between the two third outer electrodes 533 and the first outer electrode 531 is disposed between the two fourth outer electrodes 534. That is, the outer electrodes with different polarities are arranged alternately on the longer side surfaces Lf1 and Lf2 of the capacitor body 510, respectively. As shown in FIG. 16, first to fourth inner electrodes 521 to 524 include leads for connecting the first to fourth outer electrodes 531 to 534 thereto, respectively. Accordingly, in the same manner as the previous embodiments, this allows the chip to be in vertical symmetry. Particularly, referring to FIG. 16, currents flow through adjacent ones of the inner electrodes 521 to 524 in opposite directions to cancel magnet flux out, thereby reducing ELS.

Meanwhile, the inner electrodes of the first capacitor unit may be structured as shown in FIG. 18. Referring to FIG. 18, the leads of the first and second inner electrodes 521$a$ and 522$a$ of the first capacitor element CR1$a$ in the first capacitor unit CR1' have widths greater than widths of the leads of the first and second inner electrodes 521$b$ and 522$b$ of the second capacitor element CR1$b$. The second capacitor unit CR2 is configured identically to FIG. 17. Here, the first capacitor element CR1$a$ having a relatively low ESL due to a relatively great width of the leads may be disposed in a lower part of the capacitor body 510 than the second capacitor element CR1$b$. Moreover, the first and second capacitor elements CR1$a$ and CR1$b$ may include inner electrodes having leads whose widths are different. Even in this case, the capacitor element including leads with a greatest width may be disposed in a lowest part of the capacitor body.

Figure 19:
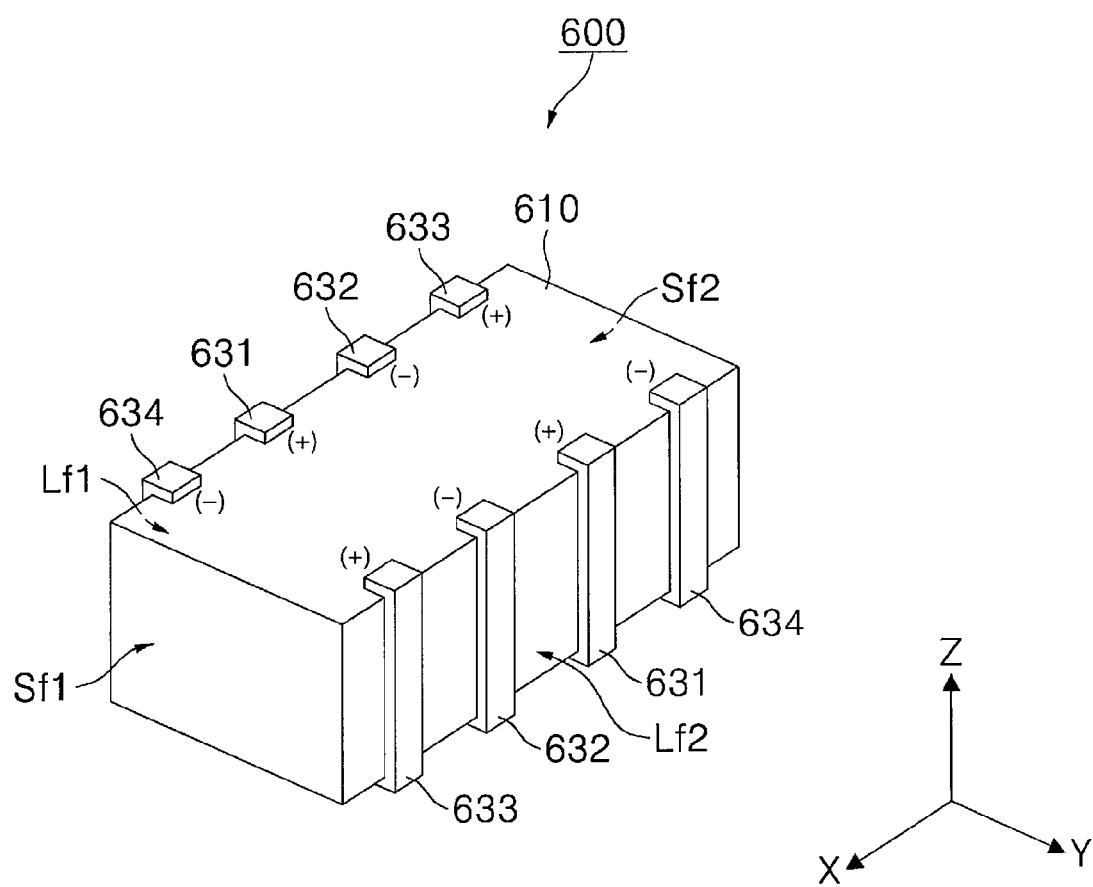
FIG. 19 is a perspective view illustrating a multilayer chip capacitor according to a further exemplary embodiment of the invention.
Figure 20:
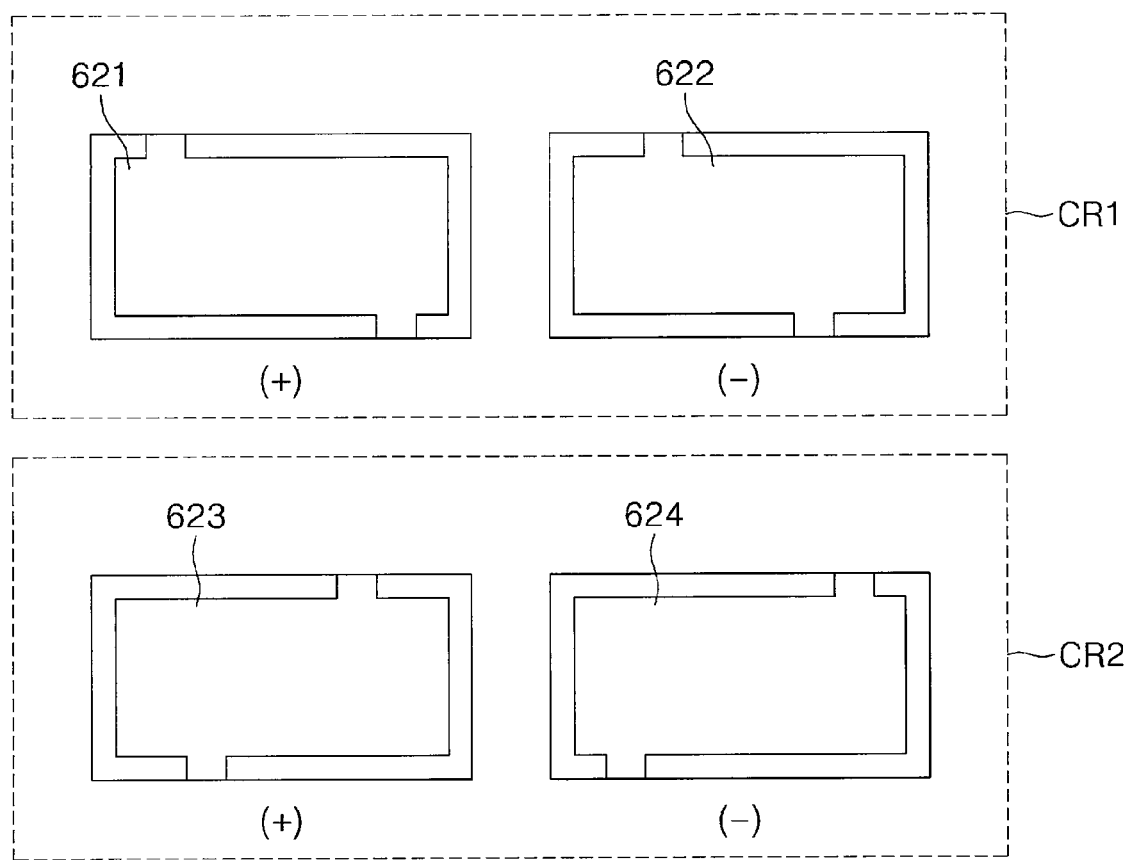
FIG. 20 is a plan view illustrating an inner electrode structure of the multilayer chip capacitor shown in FIG. 19.

FIG. 19 is a perspective view illustrating a multilayer chip capacitor according to a further exemplary embodiment of the invention. FIG. 20 is a plan view illustrating an inner electrode structure of the multilayer chip capacitor shown in FIG. 19.

In the present embodiment, the multilayer chip capacitor is shaped identically to the multilayer chip capacitor of FIG. 14 but different in the arrangement of outer electrodes and the configuration of inner electrodes. Referring to FIG. 19, the multilayer chip capacitor 600 of the present embodiment includes respective two first to fourth outer electrodes 631 to 634. Respective single ones of the first to fourth outer electrodes 631 and 634 are formed on a first longer side surface Lf1 of the capacitor body and the other ones of the first to fourth outer electrodes 631 and 634 are formed on a second longer side surface Lf2 of the capacitor body 610. Here, the first and second outer electrodes 631 and 632 are disposed between the third and fourth outer electrodes 633 and 634 but the outer electrodes of different polarities are arranged alternately to ensure the chip is in vertical symmetry. Also, as shown in FIG. 20, the first to fourth inner electrodes 621 to 624 include leads for connecting the first to fourth outer electrodes 631 to 634 thereto, respectively. Currents flow in adjacent ones of the inner electrodes 621 to 624 in opposite directions to cancel magnetic flux out, thereby reducing ESL. Here, the first and second capacitor units CR1 and CR2 are slightly different in ESL and thus any one of the first and second capacitor units CR1 and CR2 may be disposed first in an alternate laminated portion. Also, the first and second capacitor units CR1 and CR2 may include the inner electrodes having leads whose widths are different.

Figure 21:
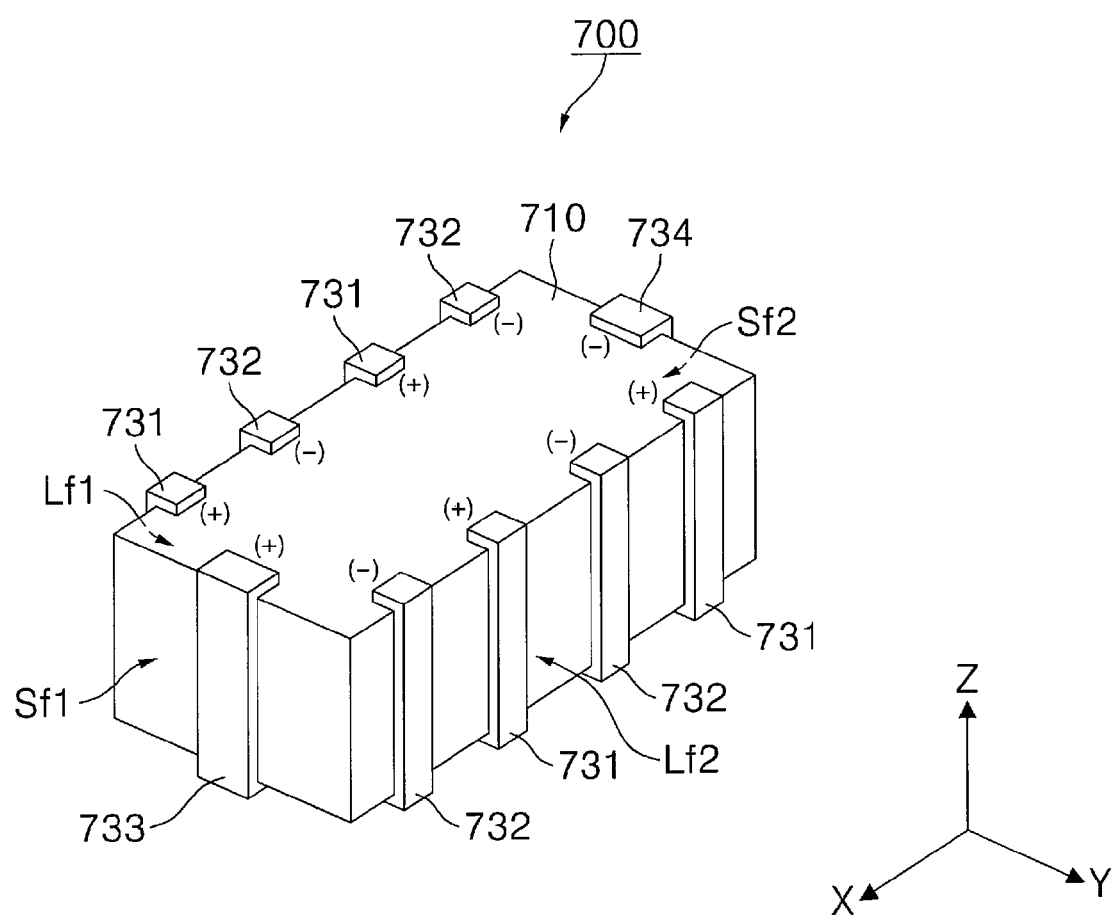
FIG. 21 is a perspective view illustrating a multilayer chip capacitor according to a further exemplary embodiment of the invention.
Figure 22:
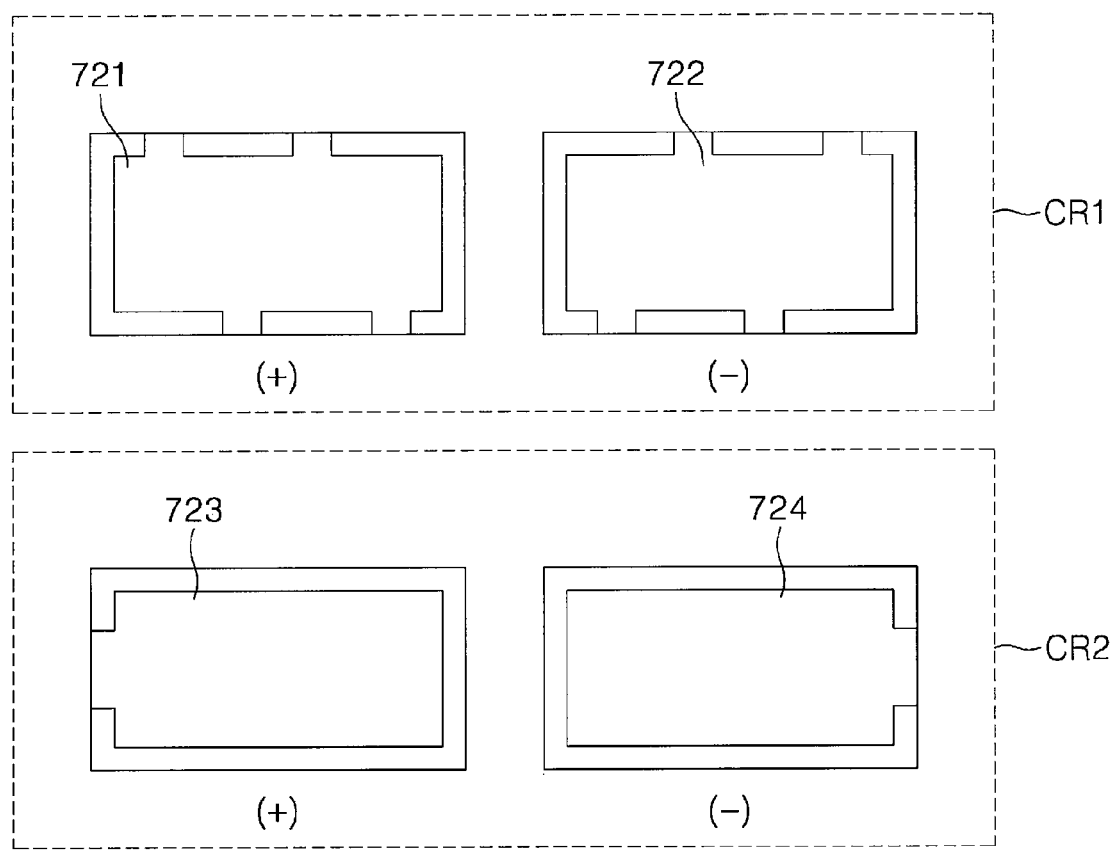
FIG. 22 is a plan view illustrating an inner electrode structure of the multilayer chip capacitor shown in FIG. 21.
Figure 23:
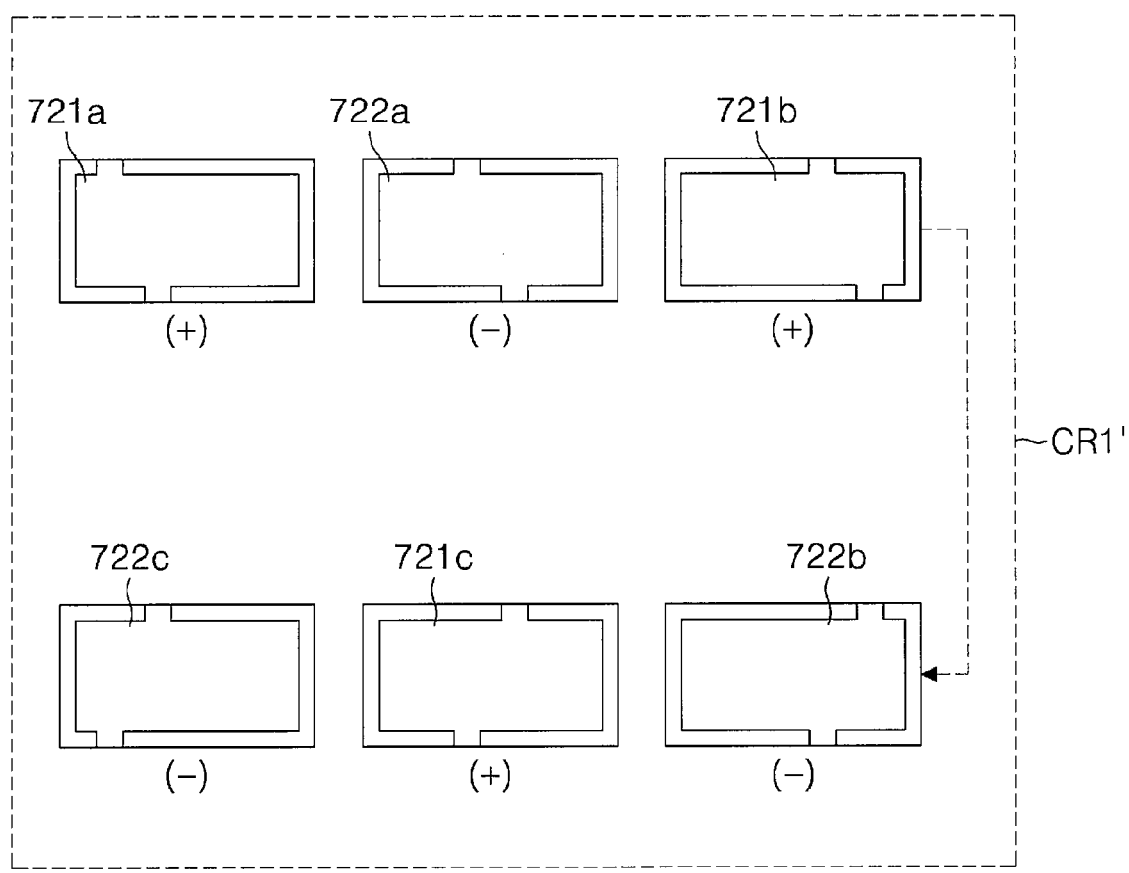
FIG. 23 is a plan view illustrating an inner electrode structure of the multilayer chip capacitor shown in FIG. 21.
Figure 24:
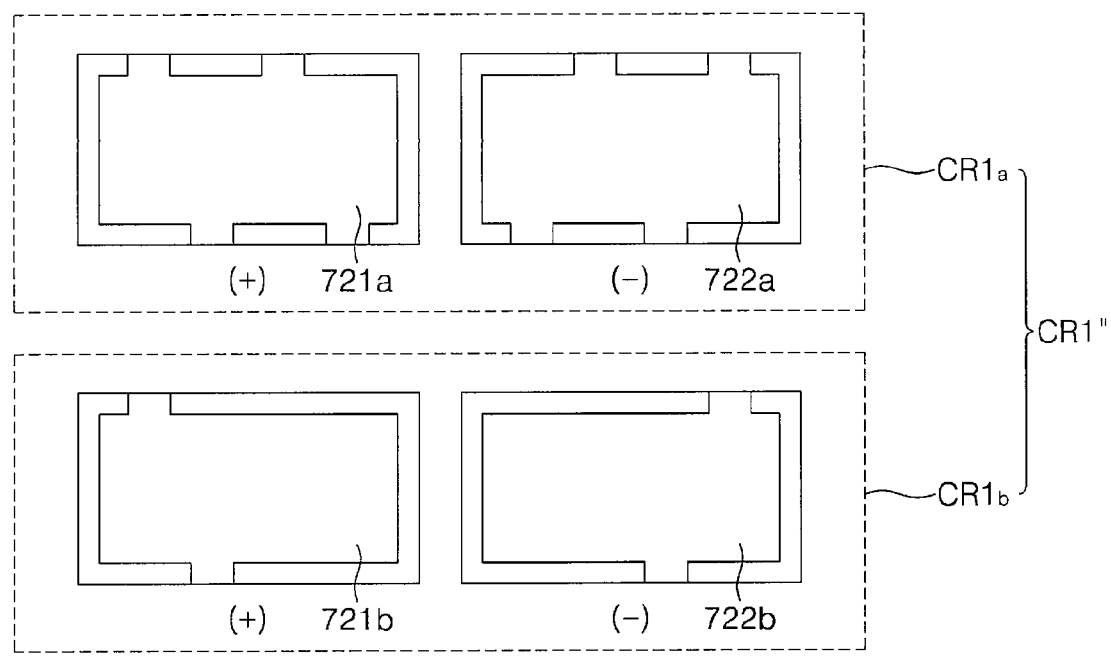
FIG. 24 is a plan view illustrating an inner electrode structure of the multilayer chip capacitor shown in FIG. 21.

FIG. 21 is a perspective view illustrating a multilayer chip capacitor according to a further exemplary embodiment of the invention. FIGS. 22 to 24 are plan views illustrating an inner electrode structure of the multilayer chip capacitor shown in FIG. 21.

Referring to FIG. 21, the multilayer chip capacitor 700 of the present embodiment includes respective four first and second outer electrodes 731 and 732. Two of the first outer electrodes 731 and two of the second outer electrodes 732 are formed alternately on a first longer side surface Lf1 of a capacitor body 710 and the other two first outer electrodes 731 and the other two second outer electrodes 732 are formed alternately on a second longer side surface Lf2 of the capacitor body 710. Also, third and fourth outer electrodes 733 and 734 are formed on first and second shorter side surfaces Sf1 and Sf2 of the capacitor body 710, respectively to constitute a ten-terminal multilayer chip capacitor (MLCC). As shown in FIG. 22, the first and second inner electrodes 721 and 722 each include four leads. The leads of the first inner electrode 721 are arranged adjacent to the leads of the inner electrodes 722 in an interdigitated configuration, and the first and second inner electrodes 721 and 722 are connected to the outer electrodes 731 and 732 of identical polarity through the leads. With this interdigitated configuration, in the first capacitor unit CR1, magnetic fluxes are cancelled out in adjacent ones of the inner electrodes to further reduce ESL.

Meanwhile, in the first capacitor unit, inner electrodes may be configured as shown in FIG. 23. Referring to FIG. 23, the first capacitor unit CR1' includes three first inner electrodes 721$a$ to 721$c$ of positive (+) polarity and three second inner electrodes 722$a$ to 722$c$ of negative (−) polarity arranged alternately on each of first and second longer side surfaces. Here, the first and second inner electrodes 721$a$ to 721$c$; 722$a$ to 722$c$ are connected to outer electrodes of identical polarity by a respective one lead. Here, the inner electrodes of identical polarity are electrically connected to one another. As shown in FIG. 23, the leads of the first and second inner electrodes 721$a$ to 721$c$; 722$a$ to 722$c$ are arranged in a zigzag shape in a laminated direction. This zigzag configuration can reduce mutual inductance of the leads adjacent to each other in a laminated direction and having identical polarity.

In the inner electrodes 721$a$ to 721$c$; 722$a$ to 722$c$, a corresponding one of the leads led out to the first longer side surface Lf1 is arranged shifted to a position corresponding to the outer electrode immediately adjacent thereto, with respect to another corresponding lead led out to the second longer side surface Lf2. This zigzag arrangement and shifted arrangement of the leads allow the inner electrodes of identical polarity in the first capacitor unit CR1 to be electrically connected to one another in the capacitor. Also, according to the present embodiment, in the first capacitor unit CR1, the leads of the first and second inner electrodes, for example, 721$a$ and 722$a$ adjacent to each other in a laminated direction are disposed adjacent to each other in a laminated direction.

Moreover, as shown in FIG. 24, some of the capacitor elements of the first capacitor unit CR1" may be different in the number of the leads of the inner electrodes. That is, the first and second inner electrodes 721$a$ and 722$a$ of the first capacitor element CR1$a$ each may include four leads and the first and second inner electrodes 721$b$ and 722$b$ of the second capacitor element CR1$b$ each may include two leads. Here, in the first capacitor unit CR1", the first capacitor element CR1$a$ having a relatively low ESL may be disposed below the second capacitor element CR1$b$.

Figure 25:
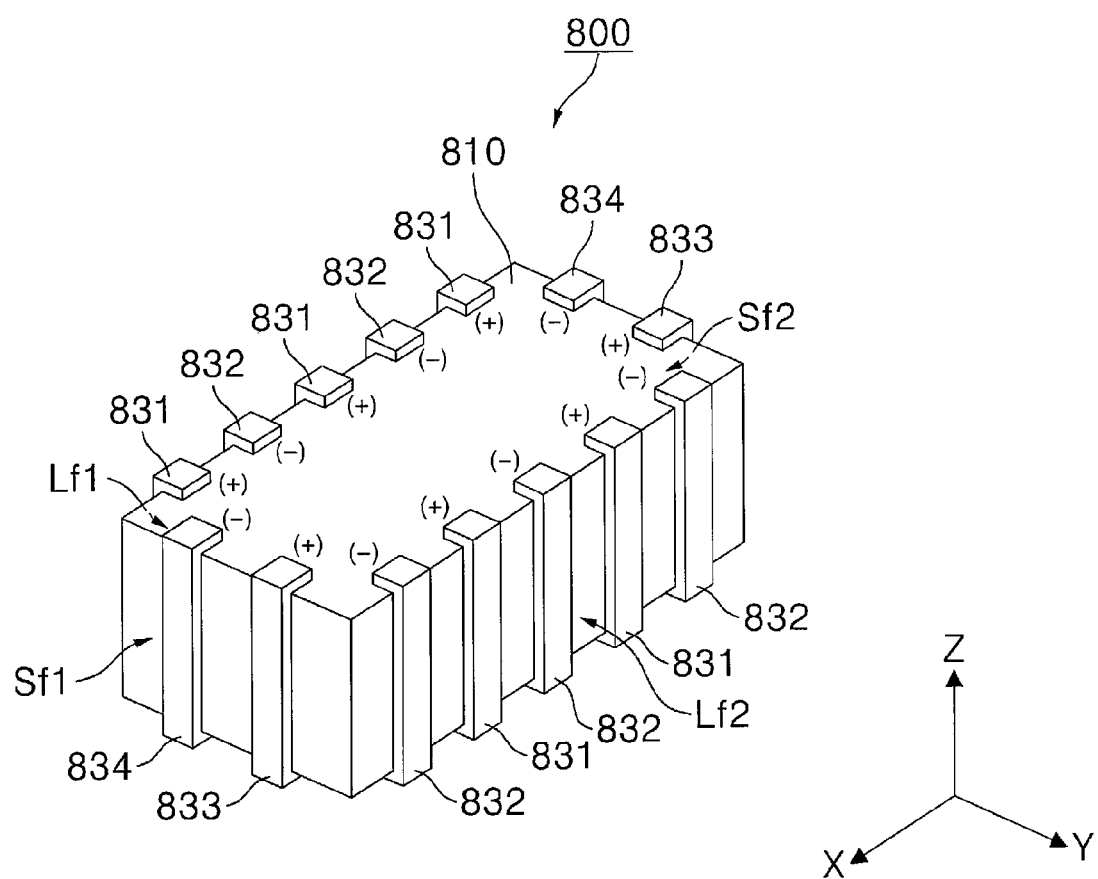
FIG. 25 is a perspective view illustrating a multilayer chip capacitor according to a further exemplary embodiment of the invention.
Figure 26:
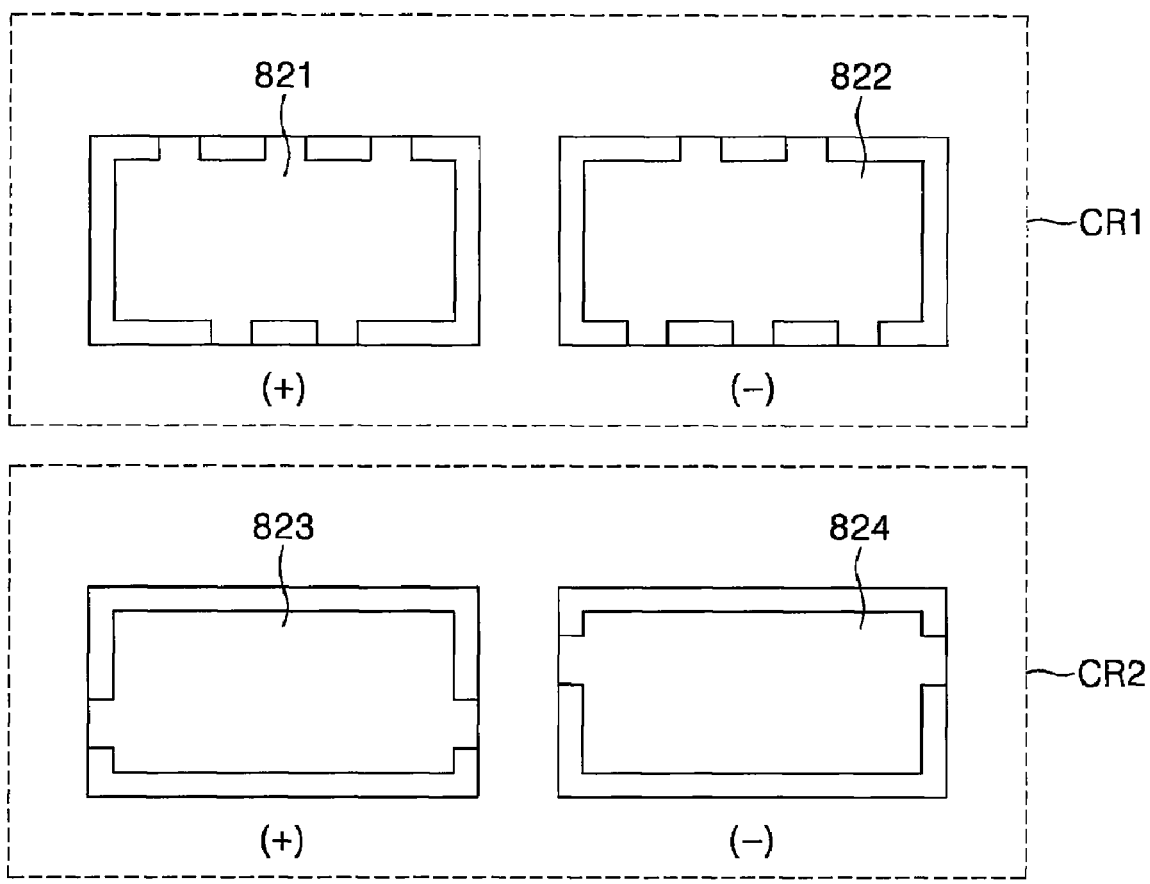
FIG. 26 is a plan view illustrating an inner electrode structure of the multilayer chip capacitor shown in FIG. 25.

FIG. 25 is a perspective view illustrating a multilayer chip capacitor according to a further exemplary embodiment of the invention. FIG. 26 is a plan view illustrating an inner electrode structure of the multilayer chip capacitor shown in FIG.

Figure 27:
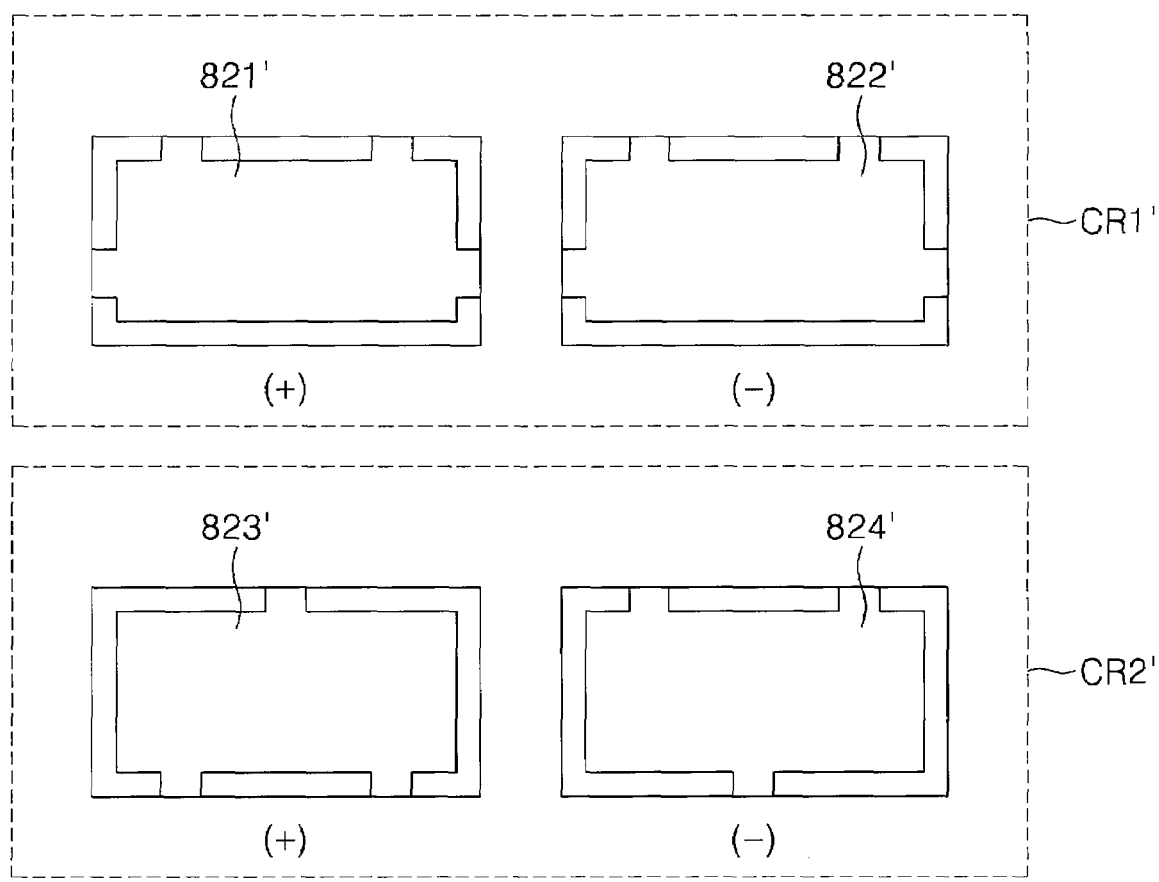
FIG. 27 is a plan view illustrating an inner electrode structure of the multilayer chip capacitor shown in FIG. 25.

25. FIG. 27 is a plan view illustrating an inner electrode structure of the multilayer chip capacitor shown in FIG. 25.

Referring to FIG. 25, the multilayer chip capacitor 800 of the present embodiment includes respective five first and second outer electrodes 831 and 832. The first and second outer electrodes 831 and 832 are arranged alternately on each of first and second longer side surfaces Lf1 and Lf2 of a capacitor body 810. Also, a respective one of third and fourth outer electrodes 833 and 834 is formed on each of first and second shorter side surfaces Sf1 and Sf2 of the capacitor body 810 to constitute a fourteen-terminal multilayer chip capacitor (MLCC). As shown in FIG. 25, five leads of the first inner electrode 821 are arranged adjacent to five leads of the second inner electrode 822 in an interdigitated configuration, and the first and second inner electrodes 821 and 822 are connected to the outer electrodes 831 and 832 of identical polarity through the leads. With this interdigitated configuration, in the first capacitor unit CR1, magnetic fluxes are cancelled out each other in adjacent ones of the inner electrodes to further reduce ESL. Meanwhile, as shown in FIG. 27, the first and second inner electrodes 821' and 822' of the first capacitor unit CR1' may be connected to the longer side surface and shorter side surface, respectively. Also, the third and fourth inner electrodes 823' and 824' of the second capacitor unit CR2' may be connected only to the longer side surface.

Figure 28:
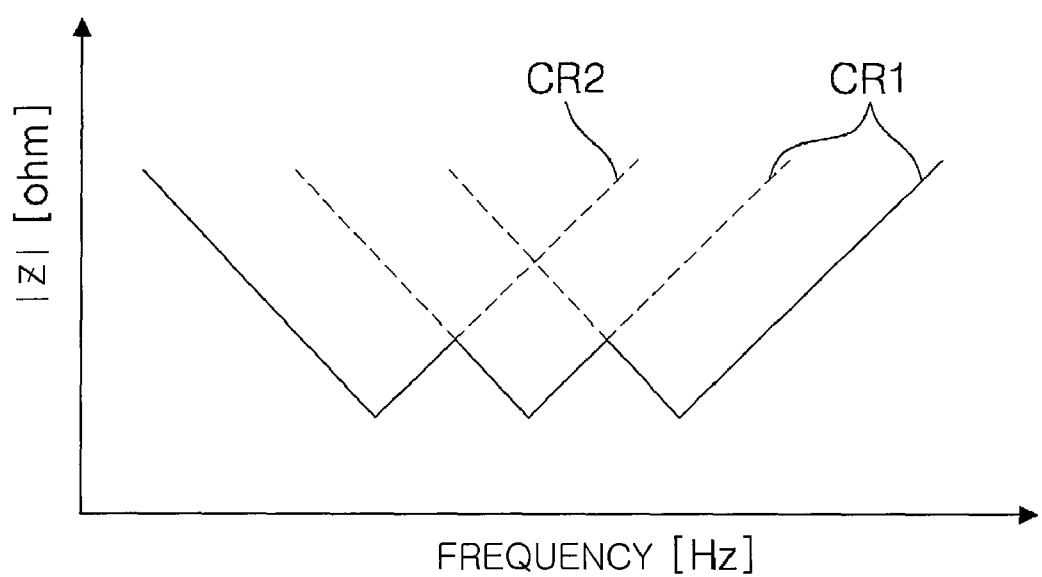
FIG. 28 is a graph illustrating impedance characteristics of a multilayer chip capacitor manufactured according to an exemplary embodiment of the invention.

FIG. 28 is a graph illustrating impedance characteristics of a multilayer chip capacitor manufactured according to an exemplary embodiment of the invention. The multilayer chip capacitor of the present embodiment includes first and second capacitor units, as a single chip. Furthermore, at least one of the first and second capacitor units includes a capacitor element different from other capacitor elements in the lamination number of inner electrodes, i.e., capacitance, or resonant frequency. Accordingly, as shown in FIG. 28, the multilayer chip capacitor employed as a single chip allows impedance to be maintained at a low level in a wide frequency range. As shown in FIG. 28, a low frequency range is influenced by the second capacitor unit with a relatively high ESL and a high frequency range is influenced by the first capacitor unit with a relatively low ESL.

As set forth above, according to exemplary embodiments of the invention, a single capacitor is employed to reduce a PDN impedance to a target impedance or less in a wide frequency range from hundreds of kHz to hundreds of MHz. Thus significantly reduces the number of decoupling capacitors utilized in a digital switching circuit such as a high speed MPU and ensures the decoupling capacitors to be effectively mounted in a less space and at a lower cost. Also, the multilayer chip capacitor including capacitor units with different capacitances as a single chip is prevented from a decline in capacitance.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
a capacitor body having a plurality of dielectric layers laminated therein, the capacitor body comprising first and second capacitor units arranged therein; and
first to fourth outer electrodes formed on an outer surface of the capacitor body,
wherein the first capacitor unit comprises first and second inner electrodes opposing each other while interposing a corresponding one of the dielectric layers, the first and second inner electrodes connected to the first and second outer electrodes and not connected to third and fourth outer electrodes, respectively to have polarity different from each other, and the first capacitor unit comprises a plurality of capacitor elements each having a pair of the first and second inner electrodes repeatedly laminated,
the second capacitor unit comprises the third and fourth inner electrodes opposing each other while interposing another corresponding one of the dielectric layers, the third and fourth inner electrodes connected to the third and fourth outer electrodes and not connected to the first and second outer electrodes, respectively to have polarity identical to the first and second inner electrodes, and the second capacitor unit comprises at least one capacitor element having a pair of the third and fourth inner electrodes repeatedly laminated, and
at least one of the capacitor elements of the first capacitor unit is different from the other capacitor elements of the first capacitor unit in a lamination number of the first and second inner electrodes or a resonant frequency.

2. The multilayer chip capacitor of claim 1, wherein the plurality of capacitor elements of the first capacitor unit are arranged alternately with the at least one capacitor element of the second capacitor unit in a laminated direction of the dielectric layers.

3. The multilayer chip capacitor of claim 1, wherein a corresponding one of the capacitor elements of the first capacitor unit is disposed in a lowermost part of the capacitor body.

4. The multilayer chip capacitor of claim 1, wherein out of the plurality of capacitor elements of the first capacitor unit, a corresponding one of the capacitor element having a smallest lamination number of the first and second inner electrodes is disposed in a lowermost part of the first capacitor unit.

5. The multilayer chip capacitor of claim 1, wherein the at least one of capacitor elements of the second capacitor comprises a plurality of capacitor elements, and out of the plurality of capacitor elements of the second capacitor unit, a corresponding one of the capacitor elements having a smallest lamination number of the third and fourth inner electrodes is disposed in a lowermost part of the second capacitor unit.

6. The multilayer chip capacitor of claim 1, wherein the first and second inner electrodes comprise leads for connecting the first and second outer electrodes thereto, respectively, and at least one of the capacitor elements of the first capacitor unit is different from the other capacitor elements of the first capacitor unit in a width of the leads of the first and second inner electrodes.

7. The multilayer chip capacitor of claim 1, wherein the first and second inner electrodes comprise leads for connecting the first and second outer electrodes thereto, respectively, and at least one of the capacitor elements of the first capacitor unit is different from the other capacitor elements of the first capacitor unit in the number of the leads of the first and second inner electrodes.

8. The multilayer chip capacitor of claim 1, wherein the at least one capacitor element of the second capacitor unit comprises a plurality of capacitor elements,
wherein at least one of the capacitor elements of the second capacitor unit is different from the other capacitor elements of the second capacitor unit in a lamination number of the third and fourth inner electrodes or a resonant frequency.

9. The multilayer chip capacitor of claim 8, wherein the third and fourth inner electrodes comprise leads for connecting the third and fourth outer electrodes thereto, respectively, and at least one of the plurality of capacitor elements of the second capacitor unit is different from the other capacitor elements of the second capacitor unit in a width of the leads of the third and fourth inner electrodes.

10. The multilayer chip capacitor of claim 8, wherein the third and fourth inner electrodes comprise leads for connecting the third and fourth outer electrodes are connected thereto, respectively, and at least one of the plurality of capacitor elements of the second capacitor unit is different from the other capacitor elements of the second capacitor unit in the number of the leads of the third and fourth inner electrodes.

11. The multilayer chip capacitor of claim 1, wherein the one pair of first and second inner electrodes in the first capacitor unit define one layer, and the one pair of third and fourth inner electrodes in the second capacitor unit define another layer,
wherein an equivalent series inductance per layer of the first and second inner electrodes is smaller than an equivalent series inductance per layer of the third and fourth inner electrodes.

12. The multilayer chip capacitor of claim 1, wherein the first to fourth inner electrodes comprise leads for connecting the first to fourth outer electrodes thereto, respectively,
wherein the leads of the first and second inner electrodes have widths greater than widths of the leads of the third and fourth inner electrodes.

13. The multilayer chip capacitor of claim 1, wherein the first and second capacitor units are electrically insulated from each other.

14. The multilayer chip capacitor of claim 1, wherein the multilayer chip capacitor comprises a four-terminal capacitor including a respective one of the first to fourth outer electrodes.

15. The multilayer chip capacitor of claim 14, wherein the first to fourth inner electrodes are connected to the first to fourth outer electrodes through one lead, respectively.

16. The multilayer chip capacitor of claim 15, wherein the first and second outer electrodes are formed on opposing first and second longer side surfaces of the capacitor body, respectively and the third and fourth outer electrodes are formed on opposing first and second shorter side surfaces of the capacitor body, respectively.

17. The multilayer chip capacitor of claim 15, wherein the first and second outer electrodes are formed on a first longer side surface and a first shorter side surface adjacent to each other in the capacitor body, respectively, and the third outer electrode is formed on a second longer side surface opposing the first longer side surface and the fourth outer electrode is formed on a second shorter side surface opposing the first shorter side surface.

18. The multilayer chip capacitor of claim 1, wherein each of the third and fourth outer electrodes comprises two outer electrodes, and the first and second outer electrodes are formed on opposing first and second longer side surfaces of the capacitor body, and the respective two third and fourth outer electrodes are formed on the first and second longer side surfaces, respectively.

19. The multilayer chip capacitor of claim 18, wherein the first outer electrode is formed between the two third outer electrodes and the second outer electrode is formed between the two fourth outer electrodes.

20. The multilayer chip capacitor of claim 19, wherein each of the first and second outer electrodes comprises two outer electrodes.

21. The multilayer chip capacitor of claim 1, wherein each of the third and fourth outer electrodes comprises two outer electrodes,
the first and second outer electrodes are formed on opposing first and second longer side surfaces of the capacitor body, respectively, and the respective two third and fourth outer electrodes are formed on the second and first longer side surfaces, respectively.

22. The multilayer chip capacitor of claim 21, wherein the first outer electrode is formed between the two fourth outer electrodes and the second outer electrode is formed between the two third outer electrodes.

23. The multilayer chip capacitor of claim 1, wherein each of the first and second outer electrodes comprises two outer electrodes,
wherein respective single ones of the first and second outer electrodes are formed on opposing first and second longer side surfaces of the capacitor body, respectively, and each of the third and fourth outer electrodes comprises two outer electrodes,
wherein respective single ones of the third and fourth outer electrodes are formed on the opposing first and second longer side surfaces of the capacitor body, respectively.

24. The multilayer chip capacitor of claim 23, wherein on each of the first and second longer side surfaces, the first and second outer electrodes are disposed between the third and fourth outer electrodes.

25. The multilayer chip capacitor of claim 24, wherein corresponding ones of the outer electrodes adjacent to each other on the first and second longer side surfaces, respectively have polarities different form each other.

26. The multilayer chip capacitor of claim 1, wherein each of the first and second outer electrodes comprises four outer electrodes and respective two of the first and second outer electrodes are formed on opposing first and second longer side surfaces, respectively, and the third and fourth outer electrodes are formed on opposing first and second shorter side surfaces of the capacitor body.

27. The multilayer chip capacitor of claim 26, wherein the first and second outer electrodes are arranged alternately on the first and second longer side surfaces, respectively.

28. The multilayer chip capacitor of claim 27, wherein each of the first and second inner electrodes comprises four leads through which the first and second outer electrodes are connected thereto,
the leads of the first inner electrodes are arranged adjacent to the leads of the second inner electrodes in an interdigitated configuration to be connected to corresponding ones of the outer electrodes having identical polarity.

29. The multilayer chip capacitor of claim 27, wherein each of the first and second inner electrodes includes two leads led out to the first and second longer side surfaces, respectively and connected to the first and second outer electrodes, respectively,
in the each of the first and second inner electrodes, a corresponding one of the leads led out to the first longer side surface is arranged shifted to a position corresponding to the outer electrode immediately adjacent thereto, with respect to another corresponding lead led out to the second longer side surface, and
in the first capacitor unit, the leads led out to each of the first and second longer side surfaces are arranged in a zigzag shape with respect to each other along a laminated direction from the longer side surface.

30. A multilayer chip capacitor comprising:
a capacitor body having a plurality of dielectric layers laminated therein, the capacitor body comprising first and second capacitor units arranged therein; and
first to fourth outer electrodes formed on an outer surface of the capacitor body, wherein the first capacitor unit comprises first and second inner electrode opposing each other while interposing a corresponding one of the dielectric layers, the first and second inner electrodes connected to the first and second outer electrodes and not connected to third and fourth outer electrodes, respectively to have polarity different from each other, and the first capacitor unit comprises a plurality of capacitor elements each having a pair of the first and second inner electrodes repeatedly laminated, the second capacitor unit comprises the third and fourth inner electrodes opposing each other while interposing another corresponding one of the dielectric layers, the third and fourth inner electrodes connected to the third and fourth outer electrodes and not connected to the first and second outer electrodes, respectively to have polarity identical to the first and second inner electrodes, and the second capacitor unit comprises a plurality of capacitor elements each having a pair of the third and fourth inner electrodes repeatedly laminated, and at least one of the capacitor elements of the second capacitor unit is different from the other capacitor elements of the first capacitor unit in a lamination number of the first and second inner electrodes or a resonant frequency.

31. The multilayer chip capacitor of claim 30, wherein the plurality of capacitor elements of the first capacitor unit are arranged alternately with the plurality of capacitor elements of the second capacitor unit in a laminated direction of the dielectric layers.

32. The multilayer chip capacitor of claim 30, wherein out of the plurality of capacitor elements of the second capacitor unit, a corresponding one of the capacitor elements having a smallest lamination number of the third and fourth inner electrodes is disposed in a lowest part of the second capacitor unit.

33. The multilayer chip capacitor of claim 30, wherein the third and fourth inner electrodes comprise leads for connecting the third and fourth outer electrodes thereto, respectively, and at least one of the capacitor elements of the second capacitor unit is different from the other capacitor elements of the second capacitor unit in a width of the leads of the third and fourth inner electrodes.

34. The multilayer chip capacitor of claim 30, wherein the third and fourth inner electrodes comprise leads for connecting the third and fourth outer electrodes thereto, respectively, and at least one of the capacitor elements of the second capacitor unit is different from the other capacitor elements of the second capacitor unit in the number of the leads of the third and fourth inner electrodes.

\* \* \* \* \*